United States Patent
Masubuchi et al.

(10) Patent No.: US 6,791,750 B2
(45) Date of Patent: Sep. 14, 2004

(54) POLARIZATION BEAM SPLITTER

(75) Inventors: Tomokazu Masubuchi, Osaka (JP); Kohtaro Hayashi, Toyonaka (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 10/304,330

(22) Filed: Nov. 26, 2002

(65) Prior Publication Data

US 2004/0061937 A1 Apr. 1, 2004

(30) Foreign Application Priority Data

Sep. 26, 2002 (JP) .......................................... 2002-280188

(51) Int. Cl.⁷ ........................... G02B 1/10; G02B 5/28; G02B 5/30
(52) U.S. Cl. ........................ 359/487; 359/485; 359/583; 359/588
(58) Field of Search .................. 359/487, 483, 359/485, 583, 588, 359

(56) References Cited

U.S. PATENT DOCUMENTS

| | | | | |
|---|---|---|---|---|
| 4,966,438 A | * | 10/1990 | Mouchart et al. | 359/495 |
| 5,400,179 A | * | 3/1995 | Ito | 359/588 |
| 5,453,859 A | * | 9/1995 | Sannohe et al. | 349/9 |
| 5,808,795 A | * | 9/1998 | Shimomura et al. | 359/488 |
| 5,967,635 A | * | 10/1999 | Tani et al. | 353/20 |
| 6,014,255 A | * | 1/2000 | Van Der Wal et al. | 359/487 |
| 6,623,121 B2 | * | 9/2003 | Sato | 353/20 |
| 2002/0067546 A1 | * | 6/2002 | Takahara et al. | 359/487 |

FOREIGN PATENT DOCUMENTS

| | | | |
|---|---|---|---|
| JP | 07-281024 A | | 10/1995 |
| JP | 08-146218 A | * | 6/1996 |
| JP | 09-184916 A | * | 7/1997 |
| JP | 11-211916 A | | 8/1999 |
| JP | 2001-350024 A | | 12/2001 |

* cited by examiner

*Primary Examiner*—John Juba, Jr.
(74) *Attorney, Agent, or Firm*—Sidley Austin Brown & Wood LLP

(57) ABSTRACT

In a polarization beam splitter that allows effective polarization separation in a wide wavelength range with low dependency on angle of incidence, between two prisms is sandwiched a dielectric multilayer film composed of a first and a second multilayer portion that are designed with respect to a first and a second wavelength $\lambda 1$, and $\lambda 2$, respectively. Moreover, the formula $\lambda 1 < \lambda 2 \leq 155 \cdot \lambda 1$ is fulfilled, and which is greater of the difference between the refractive indices of the high-refractive-index and low-refractive-index layers in the first multilayer portion and the same difference in the second multilayer portion coincides with which is greater differences of the angles $\theta 1$ and $\theta 2$ from the prism vertex angle $\theta$.

10 Claims, 26 Drawing Sheets

WAVELENGTH

POLARIZATION BEAM SPLITTER

This application is based on Japanese Patent Application No. 2002-280188 filed on Sep. 26, 2002, the contents of which are hereby incorporated by reference.

BACKGROUND OF THE INVENTION

1. Field of the Invention

The present invention relates to a polarization beam splitter that separates P- and S-polarized light.

2. Description of the Prior Art

Polarization beam splitters that separate polarized light components that are polarized on mutually perpendicular polarization planes are used in optical systems of image display apparatuses and optical disk apparatuses. A polarization beam splitter is provided with a dielectric multilayer film having two types of dielectric with different refractive indices alternately laid on top of one another so that each layer has an optical film thickness equal to ¼ of the wavelength of light to be separated. Of the light obliquely incident on this dielectric multilayer film, P-polarized light is transmitted therethrough and S-polarized light is reflected therefrom. This makes possible the separation of the two differently polarized light components.

For efficient separation of P- and S-polarized light, it is advisable to make the angle of incidence at which light is incident on the dielectric multilayer film as close to the Brewster angle as possible. Moreover, it is preferable that the refractive index of the dielectric multilayer film and the angle at which the light travels therethrough fulfill formula (0) below.

$$\sin^2\phi = NH^2 \cdot NL^2 / [NE^2 \cdot (NH^2 + NL^2)] \tag{0}$$

where NE represents the refractive index of the medium that is located contiguous with the dielectric multilayer film and from which light enters the dielectric multilayer film, NH represents the refractive index of the high-refractive-index layers of the dielectric multilayer film, NL represents the refractive index of the low-refractive-index layers of the dielectric multilayer film, and $\phi$ represents the angle of the light relative to a normal to the dielectric multilayer film.

Moreover, it is necessary to protect the dielectric multilayer film and to package it into an easy-to-handle optical device.

In consideration of these requirements, a polarization beam splitter is generally composed of a dielectric multilayer film sandwiched between two transparent media, and the dielectric multilayer film is designed to be used at an angle of incidence of 45° and to fulfill formula (0). Moreover, to minimize the deflection of light at the interface between the transparent media and air, and to make easy the handling of separated light by making P- and S-polarized light components travel in mutually perpendicular directions after separation, the two transparent media are each formed into the shape of a prism of which the section has the shape of a right-angled isosceles triangle, with the dielectric multilayer film sandwiched between the hypotenuse surfaces of those prisms.

A conventional polarization beam splitter built as described above exhibits, when light is incident on the dielectric multilayer film at an angle of incidence of 45°, high transmissivity for P-polarized light and high reflectivity for S-polarized light over a wide wavelength range about a reference wavelength, and thus it separates the two differently polarized light components very effectively. However, a conventional polarization beam splitter exhibits high dependency on angle of incidence; that is, when the angle of incidence at which light is incident on the dielectric multilayer film deviates even slightly from the design value of 45°, the polarization beam splitter separates P- and S-polarized light less effectively, exhibiting particularly lower transmissivity for P-polarized light. That is, unless light is incident at 45°, the wavelength range in which differently polarized light components are separated effectively is extremely narrow.

Some optical systems employing a polarization beam splitter handle only light of a single wavelength. However, many such optical systems handle light spreading over a certain range of wavelengths. For example, optical systems for use in image display apparatuses handle light spreading all over the range of wavelengths of visible light. To miniaturize such optical systems, it is preferable to use as few polarization beam splitters as possible, and to make a convergent or divergent beam of light incident on a polarization beam splitter.

However, because of the above-mentioned dependency on angle of incidence, it is impossible to effectively separate light spreading over a wide wavelength range when the light is in the form of a convergent or divergent beam. Even when the principal ray of a convergent or divergent beam of light is made incident on a dielectric multilayer film at an angle of incidence of 45° as designed, the rays other than the principal ray are incident at angles deviated from 45°. Thus, only the portion of the beam quite near its principal ray is separated effectively into P- and S-polarized light, and the other portion, particularly the peripheral portion, of the beam is separated markedly less effectively.

FIGS. 25 to 27 show the relationship between the wavelength of light and transmissivity in a conventional polarization beam splitter. In these figures, thick lines represent the transmissivity for S-polarized light, and thin lines represent the transmissivity for P-polarized light. FIG. 25 deals with the ray that makes an angle of 45° with a normal to the dielectric multilayer film before entering the prism (i.e., in the layer of air). This ray is incident on the dielectric multilayer film at an angle of incidence of 45°. FIG. 26 deals with the ray that makes an angle of 34.7° with a normal to the dielectric multilayer film before entering the prism. FIG. 27 deals with the ray that makes an angle of 55.3° with a normal to the dielectric multilayer film before entering the prism. These three rays correspond to the principal ray and the two outermost rays of a convergent or divergent beam of light of which the f-number as observed in the layer of air is 2.8 and of which the principal ray makes an angle of 45° with the dielectric multilayer film. The refractive index Nd of the prism is 1.84.

As FIG. 25 clearly shows, with the principal ray, which is incident on the dielectric multilayer film at an angle of incidence of 45°, it is possible to separate P- and S-polarized light effectively over a wide wavelength range of from about 440 nm to about 640 nm. However, as FIG. 26 shows, with the outermost ray that is incident on the dielectric multilayer film at the smallest angle of incidence, effective polarization separation is possible only in wavelength ranges of from about 490 nm to about 540 nm and from about 600 nm to about 670 nm. Moreover, as FIG. 27 shows, with the outermost ray that is incident on the dielectric multilayer film at the largest angle of incidence, effective polarization separation is possible only in wavelength ranges of from about 380 nm to about 430 nm and from about 490 nm to about 600 nm.

Thus, the wavelength range in which the whole beam of light having an f-number of 2.8 is effectively separated into P- and S-polarized light is extremely narrow, namely from 490 nm to 540 nm. The greater the f-number of the beam of light, the wider the wavelength range in which effective polarization separation is possible, but increasing the f-number poses a demanding requirement on the beam of light to be subjected to polarization separation. This makes it difficult to miniaturize optical systems incorporating polarization beam splitters.

As one way to overcome this inconvenience, there have conventionally been proposed (for example, in Japanese Patent Applications Laid-Open Nos. H7-281024, H11-211916, and 2001-350024) polarization beam splitters in which the dielectric multilayer film is composed of two multilayer portions, of which the first is designed to fulfill formula (0) at the angle ($\phi 1$) of a first ray with respect to a first reference wavelength and of which the second is designed to fulfill formula (0) at the angle ($\phi 2$) of a second ray with respect to a second reference wavelength. In a polarization beam splitter built in this way, the wavelength range in which each multilayer portion allows effective polarization separation with low dependency on angle of incidence is no wider than that obtained conventionally, but it is possible to make the two multilayer portions cover different wavelength ranges so that the dielectric multilayer film as a whole allows effective polarization separation with low dependency on angle of incidence in a wider wavelength range.

However, simply designing a dielectric multilayer film to cope with different reference wavelengths and different angles of light does not always result in the two multilayer portions allowing effective polarization separation in continuous wavelength ranges. If the wavelength ranges in which the two multilayer portions allow effective polarization separation are not continuous, the dielectric multilayer film as a whole may allow effective polarization separation in a wider wavelength range, but this wavelength range includes, within itself, a partial wavelength range in which polarization separation is less effective.

SUMMARY OF THE INVENTION

An object of the present invention is to provide a polarization beam splitter that allows effective polarization separation in a wide wavelength range and that exhibits low dependency on angle of incidence all over that wavelength range.

To achieve the above object, according to the present invention, in a polarization beam splitter provided with a first prism including a first surface on which light is incident and a second surface that makes an acute angle with the first surface, a second prism disposed so as to face the second surface of the first prism, and a dielectric multilayer film sandwiched between the surfaces of the first and second prisms that face each other and composed of a first multilayer portion having high-refractive-index layers and low-refractive-index layers laid alternately on one another so that each layer has an optical film thickness equal to ¼ of a first wavelength and a second multilayer portion having high-refractive-index layers and low-refractive-index layers laid alternately on one another so that each layer has an optical film thickness equal to ¼ of a second wavelength, the condition expressed by formula (1) is fulfilled, and in addition, for angles $\theta 1$ and $\theta 2$ that respectively fulfill the conditions expressed by formulae (2) and (3), the conditions expressed by formulae (4) and (5), or (6) and (7), are fulfilled.

$$\lambda 1 < \lambda 2 \leq 1.55 \cdot \lambda 1 \tag{1}$$

$$\sin^2\theta 1 = NH1^2 \cdot NL1^2 / [Nd^2 \cdot (NH1^2 + NL1^2)] \tag{2}$$

$$\sin^2\theta 2 = NH2^2 \cdot NL2^2 / [Nd^2 \cdot (NH2^2 + NL2^2)] \tag{3}$$

$$|NH1-NL1| < |NH2-NL2| \tag{4}$$

$$|\theta 1-\theta| < |\theta 2-\theta| \tag{5}$$

$$|NH1-NL1| > |NH2-NL2| \tag{6}$$

$$|\theta 1-\theta| > |\theta 2-\theta| \tag{7}$$

where $\lambda 1$ represents the first wavelength, $\lambda 2$ represents the second wavelength, $\theta$ represents the angle that the first and second surfaces of the first prism make with each other, Nd represents the refractive index of the first prism, NH1 represents the refractive index of the high-refractive-index layers of the first multilayer portion, NL1 represents the refractive index of the low-refractive-index layers of the first multilayer portion, NH2 represents the refractive index of the high-refractive-index layers of the second multilayer portion, and NL2 represents the refractive index of the low-refractive-index layers of the second multilayer portion. The angles $\theta 1$ and $\theta 2$ are those formed by the light traveling through the dielectric multilayer film relative to a normal thereto.

In this polarization beam splitter, light is introduced into it through the first surface of the first prism, and is then separated into P- and S-polarized light by the dielectric multilayer film sandwiched between the first and second prisms. The dielectric multilayer film is composed of the first and second multilayer portions, of which the first is designed to fulfill formula (0) noted earlier at a first angle $\theta 1$ with respect to a reference wavelength set at a first wavelength $\lambda 1$ (formula (2)) and of which the second is designed to fulfill formula (0) at a second angle $\theta 2$ with respect to a reference wavelength set at a second wavelength $\lambda 2$ (formula (3)).

Here, the second wavelength $\lambda 2$ is longer than the first wavelength $\lambda 1$, and the second wavelength $\lambda 2$ is so set as to be equal to or shorter than 1.55 times the first wavelength $\lambda 1$. The angle $\theta$ that the first and second surfaces of the first prism makes with each other (i.e., the prism vertex angle) is equal to the angle of incidence at which the ray that is incident perpendicularly on the first surface is incident on the dielectric multilayer film. Thus, between the first angle $\theta 1$, which fulfills formula (2) in the first multilayer portion, and the angle of incidence $\theta$ at which the ray that is incident perpendicularly on the first surface is incident on the dielectric multilayer film, there is a difference of which the absolute value is equal to $|\theta 1-1|$. Likewise, between the second angle $\theta 2$, which fulfills formula (3) in the second multilayer portion, and the angle of incidence $\theta$ at which the ray that is incident perpendicularly on the first surface is incident on the dielectric multilayer film, there is a difference of which the absolute value is equal to $|\theta 2-1|$.

These differences in angle are determined according to which is greater of the difference between the refractive indices of the high-refractive-index and low-refractive-index layers in the first multilayer portion and that in the second multilayer portion. When the difference between the refractive indices of the high-refractive-index and low-refractive-index layers is greater in the second multilayer portion than in the first multilayer portion (formula (4)), the difference between the second angle and the prism vertex angle is made greater than the difference between the first angle and the prism vertex angle (formula (5)). On the other hand, when the difference between the refractive indices of the high-refractive-index and low-refractive-index layers is greater in the first multilayer portion than in the second multilayer portion (formula (6)), the difference between the first angle and the prism vertex angle is made greater than the difference between the second angle and the prism vertex angle (formula (7)).

When formula (1) is fulfilled, and in addition, for the angles θ1 and θ2 that respectively fulfill formulae (2) and (3), formulae (4) and (5), or (6) and (7), are fulfilled, then the first and second multilayer portions allow effective polarization separation with low dependency on angle of incidence in different wavelength ranges, with an overlap secured between those two wavelength ranges. That is, it is possible to realize a dielectric multilayer film of which the dependency on angle of incidence remains low over two continuous wavelength ranges.

In one example, the high-refractive-index layers of the first multilayer portion is made of $TiO_2$ or $Ta_2O_5$, the low-refractive-index layers of the first multilayer portion is made of $MgF_2$ or $SiO_2$, the high-refractive-index layers of the second multilayer portion is made of $TiO_2$ or $Ta_2O_5$, and the low-refractive-index layers of the second multilayer portion is made of a mixture of $Al_2O_3$ and $La_2O_3$, a mixture of $Al_2O_3$ and $La_2O$, or $Al_2O_3$.

In another example, the high-refractive-index layers of the first multilayer portion is made of a mixture of $TiO_2$ and $La_2O_3$, a mixture of $TiO_2$ and $La_2O$, or $Ta_2O_5$, the low-refractive-index layers of the first multilayer portion is made of $MgF_2$ or $SiO_2$, the high-refractive-index layers of the second multilayer portion is made of $TiO_2$ or $Ta_2O_5$, and the low-refractive-index layers of the second multilayer portion is made of a mixture of $Al_2O_3$ and $La_2O_3$, a mixture of $Al_2O_3$ and $La_2O$, or $Al_2O_3$.

In another example, the high-refractive-index layers of the first multilayer portion is made of a mixture of $Al_2O_3$ and $La_2O_3$ or a mixture of $Al_2O_3$ and $La_2O$, the low-refractive-index layers of the first multilayer portion is made of $MgF_2$, the high-refractive-index layers of the second multilayer portion is made of $TiO_2$ or $Ta_2O_5$, and the low-refractive-index layers of the second multilayer portion is made of $Al_2O_3$.

In another example, the high-refractive-index layers of the first multilayer portion is made of $Al_2O_3$, the low-refractive-index layers of the first multilayer portion is made of $MgF_2$, the high-refractive-index layers of the second multilayer portion is made of $TiO_2$ or $Ta_2O_5$, and the low-refractive-index layers of the second multilayer portion is made of $SiO_2$.

The first and second prisms may each have the shape of a right-angled isosceles triangle.

The first and second prisms may have equal refractive indices for the same wavelength.

The ratio $\lambda 2/\lambda 1$ of the wavelength $\lambda 2$ to the wavelength $\lambda 1$ may be equal to or higher than 1.1.

The light introduced through the first surface may be visible light spreading over a predetermined wavelength range between 480 nm and 750 nm.

The light introduced through the first surface may be in the form of a convergent or divergent beam of which the f-number as observed in the layer of air is 2.8 and of which; the principal ray makes an angle of 45° with the dielectric multilayer film.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 1:
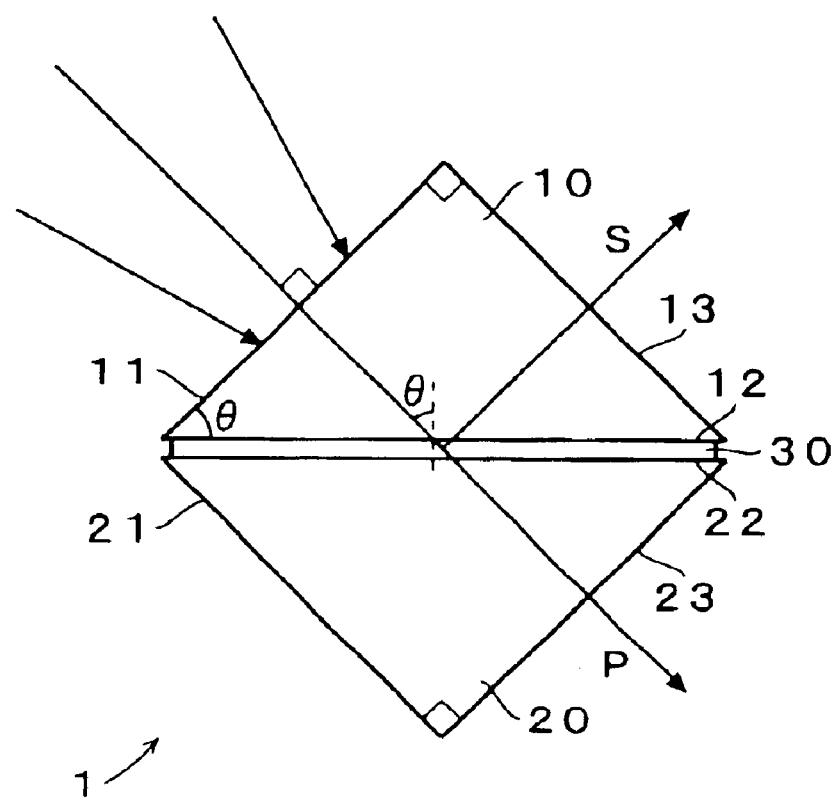
FIG. 1 is a diagram schematically showing the overall structure of a polarization beam splitter embodying the invention.

Hereinafter, an embodiment of the present invention will be described with reference to the drawings. FIG. 1 schematically shows the overall structure of a polarization beam splitter 1 embodying the invention. The polarization beam splitter 1 is composed of a first prism 10, a second prism 20, and a dielectric multilayer film 30 sandwiched between the first and second prisms 10 and 20. Light is shone obliquely on the dielectric multilayer film 30 so as to be separated into P-polarized light, which is transmitted through the dielectric multilayer film 30, and S-polarized light, which is reflected from the dielectric multilayer film 30.

The first prism 10 has a first surface 11, a second surface 12, and a third surface 13, and the first and third surfaces 11 and 13 are perpendicular to each other, making the first prism 10 a right-angled triangular prism. Likewise, the second prism 20 has a first surface 21, a second surface 22, and a third surface 23, and the first and third surfaces 21 and 23 are perpendicular to each other, making the second prism 20 a right-angled triangular prism. The first and second prisms 10 and 20 are made of the same optical material, and thus have equal refractive indices.

The first and second prisms 10 and 20 are arranged so as to face each other, with their respective second surfaces 12 and 22 located close and parallel to each other. The dielectric multilayer film 30 is sandwiched between the second surface 12 of the first prism 10 and the second surface 22 of the second prism 20. In the polarization beam splitter 1, light is introduced into it through the first surface 11 of the first prism 10. The P-polarized light, having transmitted through the dielectric multilayer film 30, exits from the polarization beam splitter 1 through the third surface 23 of the second prism 20, and the S-polarized light, having reflected from the dielectric multilayer film 30, exits the polarization beam splitter 1 through the third surface 13 of the first prism 10.

The light that is shone into the polarization beam splitter 1 so as to be subjected to polarization separation may be in the form of not only a parallel beam but also a convergent or divergent beam. The light to be subjected to polarization separation is shone on the first surface 11 of the first prism 10 in such a way that the principal ray thereof is perpendicularly incident on the first surface 11. The first and second prisms 10 and 20 are, as described above, right-angled triangular prisms. These prisms may be right-angled isosceles triangular prisms. Specifically, the first and second prisms 10 and 20 may be so shaped that, on the plane perpendicular to the first and third surfaces 11 and 13 of the first prism 10, these surfaces describe equally long lines and that, on the plane perpendicular to the first and third surfaces 21 and 23 of the second prism 20, these surfaces describe equally long lines.

When the first and second prisms 10 and 20 are formed as right-angled isosceles triangular prisms, it is possible to make the principal rays of the P- and S-polarized light after separation travel in mutually perpendicular directions. This makes easy the handling of the two differently polarized light components after separation. Moreover, it is also possible to make the principal rays of the P- and S-polarized light after separation exit perpendicularly through the third surfaces 13 and 23. This permits the S-polarized light exiting through the third surface 13 of the first prism 10 and the P-polarized light exiting through the third surface 23 of the second prism 20 to maintain the same degree of convergence or divergence as that of the light before striking the first surface 11 (that is, it is possible to keep the f-number constant). This makes easy the designing of the optical system as a whole including the polarization beam splitter 1.

However, it is not absolutely necessary to form the first and second prisms 10 and 20 as right-angled isosceles triangular prisms. The first and second prisms 10 and 20 may be given any shape so long as the angle θ that the first and second surfaces 11 and 12 of the first prism 10 make with each other (i.e., the prism vertex angle) is not greatly deviated from the Brewster angle. Moreover, the first and second prisms 10 and 20 may or may not have equal refractive indices.

Figure 2:
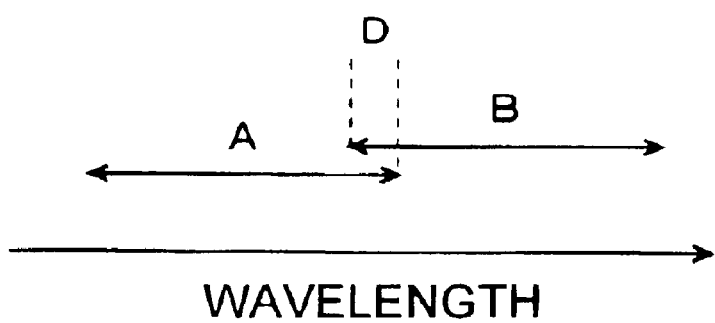
FIG. 2 is a diagram schematically showing how the wavelength ranges of light to be subjected to polarization separation are set in a polarization beam splitter embodying the invention.

FIG. 2 schematically shows how the wavelength ranges of light to be subjected to polarization separation are set in the polarization beam splitter 1. In the polarization beam splitter 1, the dielectric multilayer film 30 is composed of two multilayer portions, of which one performs polarization separation on light spreading over a wavelength range A and of which the other performs polarization separation on light spreading over a wavelength range B different from the wavelength range A, with an overlapping range D secured between those two wavelength ranges. Moreover, one multilayer portion is so formed as to exhibit low dependency on angle of incidence all over the wavelength range A, and the other multilayer portion is so formed as to exhibit low dependency on angle of incidence all over the wavelength range B, so that the dielectric multilayer film 30 as a whole exhibits low dependency on angle of incidence all over a wide wavelength range.

Figure 3:
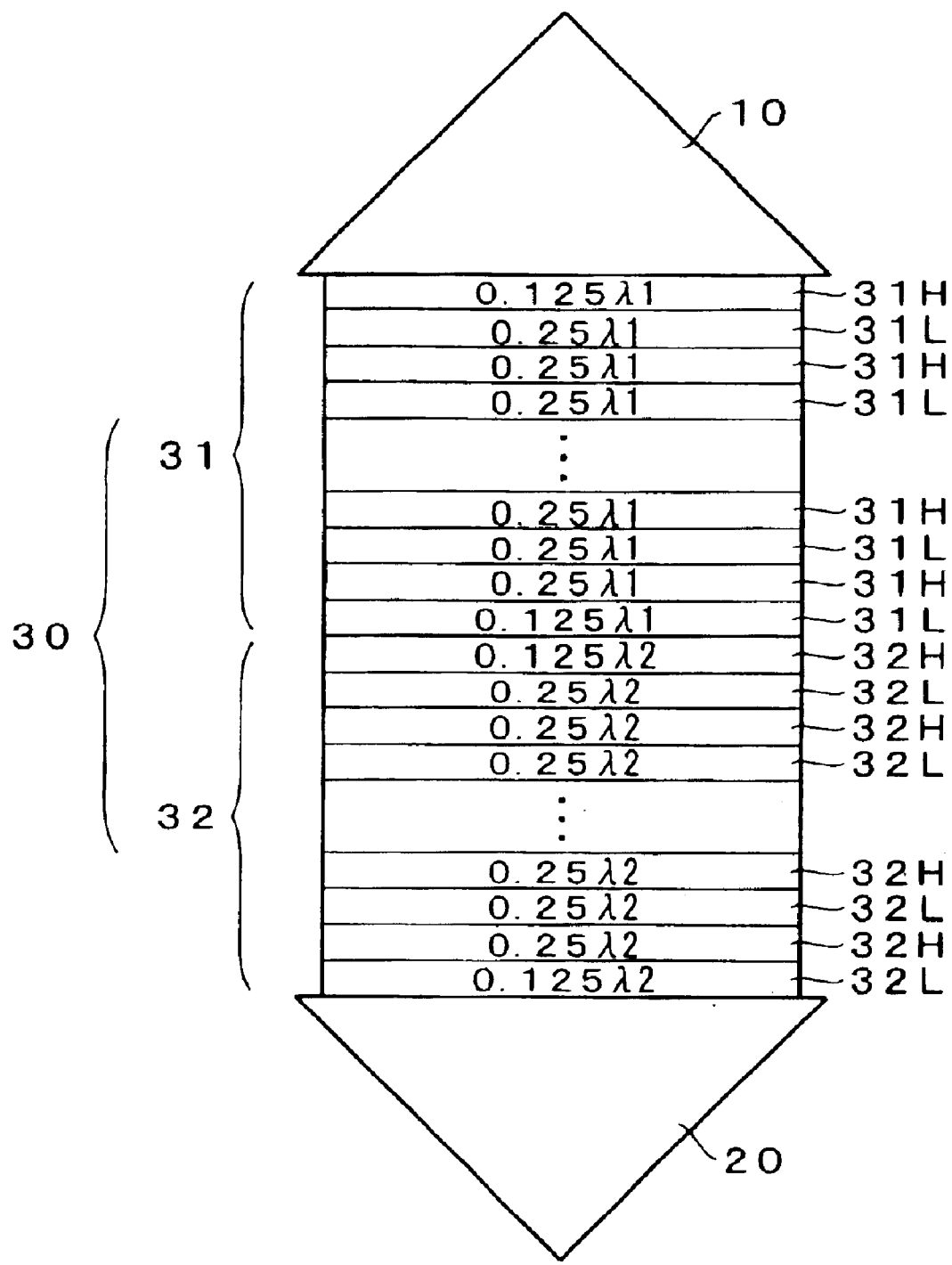
FIG. 3 is a diagram schematically showing the structure of the dielectric multilayer film used in a polarization beam splitter embodying the invention.

FIG. 3 schematically shows the structure of the dielectric multilayer film 30. The dielectric multilayer film 30 is composed of a first multilayer portion 31 and a second multilayer portion 32. The first multilayer portion 31 is composed of high-refractive-index layers 31H, having a comparatively high refractive index, and low-refractive-index layers 31L, having a comparatively low refractive index, that are laid alternately on one another. Likewise, the second multilayer portion 32 is composed of high-refractive-index layers 32H, having a comparatively high refractive index, and low-refractive-index layers 32L, having a comparatively low refractive index, that are laid alternately on one another.

Except the layer contiguous with the first prism 10 and the layer contiguous with the second multilayer portion 32, the high-refractive-index layers 31H and the low-refractive-index layers 31L of the first multilayer portion 31 are each so formed as to have an optical film thickness equal to ¼ of a first wavelength λ1. The layers contiguous with the first prism 10 and the second multilayer portion 32 are each so formed as to have an optical film thickness equal to ⅛ of the first wavelength λ1. Except the layer contiguous with the second prism 20 and the layer contiguous with the first multilayer portion 31, the high-refractive-index layers 32H and the low-refractive-index layers 32L of the second multilayer portion 32 are each so formed as to have an optical film thickness equal to ¼ of a second wavelength λ2. The layers contiguous with the second prism 20 and the first multilayer portion 31 are each so formed as to have an optical film thickness equal to ⅛ of the second wavelength λ2.

In the first multilayer portion 31, the high-refractive-index and low-refractive-index layers 31H and 31L may be laid in reverse order, and, in the second multilayer portion 32, the high-refractive-index and low-refractive-index layers 32H and 32L may be laid in reverse order. In the first multilayer portion 31, the total number of high-refractive-index and low-refractive-index layers 31H and 31L may be even or odd. Likewise, in the second multilayer portion 32, the total number of high-refractive-index and low-refractive-index layers 32H and 32L may be even or odd. Either of the first and second multilayer portions 31 and 32 may be arranged on the first prism 10 side. The layers having an optical film thickness equal to ⅛ of the wavelength λ1 or λ2 may have the same refractive index as the dielectric layer contiguous therewith, or may have any other optical film thickness, or may be omitted.

Let the refractive index of the first prism 10 be refractive index of the high-refractive-index layers 31H of the first multilayer portion 31 be NH1, the refractive index of the low-refractive-index layers 31L of the first multilayer portion 31 be NL1, the refractive index of the high-refractive-index layers 32H of the second multilayer portion 32 be NH2, the refractive index of the low-refractive-index layers 32L of the second multilayer portion 32 be NL2, a first angle relative to a normal to the dielectric multilayer film 30 be θ1, and a second angle relative to a normal to the dielectric multilayer film 30 be θ2. Then, the polarization beam splitter 1 is designed to fulfill the conditions described below.

The first multilayer portion 31 is so formed as to fulfill formula (2) noted earlier, i.e., fulfill formula (0) at the first angle θ1. The second multilayer portion 32 is so formed as to fulfill formula (3) noted earlier, i.e., fulfill formula (0) at the second angle θ2.

The first wavelength λ1, which is the reference wavelength of the first multilayer portion 31, and the second wavelength λ2, which is the reference wavelength of the second multilayer portion 32, are so set that the second wavelength λ2 is longer than the first wavelength λ1 and equal to or shorter than 1.55 times the first wavelength λ1. That is, these wavelengths are so set as to fulfill formula (1). When the wavelength ratio λ2/λ1 is too high, there is no overlap between the wavelength ranges in which the first and second multilayer portions 31 and 32 allow effective polarization separation, and thus the wavelength range in which the dielectric multilayer film 30 allows polarization separation includes, within itself, a partial wavelength range in which polarization separation is less effective. This inconvenience can be avoided by restricting the wavelength ratio λ2/λ1 to 1.55 or lower.

The lower the wavelength ratio λ2/λ1 the wider the overlap between the wavelength ranges in which the first and second multilayer portions 31 and 32 allow effective polarization separation, and thus the narrower the wavelength range in which the dielectric multilayer film 30 allows effective polarization separation. To avoid making too narrow the wavelength range in which the dielectric multilayer film 30 allows effective polarization separation, it is advisable to set the wavelength ratio λ2/λ1 at about 1.1 or higher.

In addition, when the difference |NH1−NL1| between the refractive indices NH1 and NL1 of the high-refractive-index and low-refractive-index layers 31H and 31L of the first multilayer portion 31 is smaller than the difference |NH2−NL2| between the refractive indices NH2 and NL2 of the high-refractive-index and low-refractive-index layers 32H and 32L of the second multilayer portion 32, the first and second angles θ1 and θ2 are so set that the absolute value of the difference |θ1−θ| between the first angle θ1 and the prism vertex angle θ is smaller than the absolute value of the difference |θ2−θ| between the second angle θ2 and the prism vertex angle θ. On the other hand, when the refractive index difference |NH1−NL1| in the first multilayer portion 31 is greater than the refractive index difference |NH2−NL2| in the second multilayer portion 32, the first and second angles θ1 and θ2 are so set that the absolute value of the difference |θ1−θ| between the first angle θ1 and the prism vertex angle θ is greater than the absolute value of the difference |θ2−θ| between the second angle θ2 and the prism vertex angle θ. That is, formulae (4) and (5) are fulfilled, or alternatively formulae (6) and (7) are fulfilled.

When designed as described above, the polarization beam splitter 1 allows effective separation of P- and S-polarized light in a wide wavelength range and exhibits low dependency on angle of incidence all over that wavelength range, as exemplified by practical examples presented below. The individual dielectric layers 31, 31L, 32H, and 32L of the dielectric multilayer film 30 are formed by a conventionally well-established film formation method such as sputtering, plasma ion plating, ion beam assist, or the like.

Hereinafter, practical examples of how the polarization beam splitter 1 is designed in reality will be presented. In all of these practical examples, the first and second prisms 10 and 20 are formed as right-angled isosceles triangular prisms, and thus the vertex angle θ that the first and second surfaces 11 and 12 of the first prism 10 make with each other is 45°. The refractive index of the second prism 20 is equal to the refractive index Nd of the first prism 10.

The first multilayer portion 31 of the dielectric multilayer film 30 includes, as the layer contiguous with the first prism 10 and the layer contiguous with the second multilayer portion 32, layers each having an optical film thickness equal to ⅛ of the first wavelength λ1. Likewise, the second multilayer portion 32 includes, as the layer contiguous with the second prism 20 and the layer contiguous with the first multilayer portion 31, layers each having an optical film thickness equal to ⅛ of the second wavelength λ2. One dielectric layer having an optical film thickness equal to ¼ of the wavelength λ1 (or λ2), together with those portions of the two dielectric layers sandwiching it from both sides which each correspond to an optical film thickness equal to ⅛ of the wavelength λ1 (or λ2), constitutes one unit, and the structure of each of the first and second multilayer portions 31 and 32 is designated by the number of units constituting it.

PRACTICAL EXAMPLE 1

Table 1 shows an overview of the design of Practical Example 1.

TABLE 1

| | |
|---|---|
| Prism Vertex Angle θ: | 45° |
| Prism Refractive Index Nd: | 1.84 |
| First Multilayer Portion 31 | |
| Number of Units: | 10 |
| First Wavelength λ1: | 740 nm |
| Material of High-Refractive-Index Layers 31H: | TiO$_2$ or Ta$_2$O$_5$ |
| Material of Low-Refractive-Index Layers 31L: | MgF$_2$ |
| Refractive Index NH1 of High-Refractive-Index Layers 31H: | 2.200 |
| Refractive Index NL1 of Low-Refractive-Index Layers 31L: | 1.385 |
| Refractive Index Difference \| NH1 − NL1 \|: | 0.815 |
| Angle Difference \| θ1 − θ \|: | 5.467 |
| Second Multilayer Portion 32 | |
| Number of Units: | 10 |
| Second Wavelength λ2: | 1065.6 nm |
| Material of High-Refractive-Index Layers 32H: | TiO$_2$ or Ta$_2$O$_5$ |
| Material of Low-Refractive-Index Layers 32L: | A Mixture of Al$_2$O$_3$ and La$_2$O$_3$ or a Mixture of Al$_2$O$_3$ and La$_2$O |
| Refractive Index NH2 of High-Refractive-Index Layers 32H: | 2.200 |
| Refractive Index NL2 of Low-Refractive-Index Layers 32L: | 1.710 |
| Refractive Index Difference \| NH2 − NL2 \|: | 0.490 |
| Angle Difference \| θ2 − θ \|: | 2.156 |
| Wavelength Ratio λ2 / λ1: | 1.440 |

When the high-refractive-index layers 31H and 32H are made of Ta$_2$O$_5$, an impurity is added thereto by ion plating or sputtering. This permits Ta$_2$O$_5$ to have the refractive index noted above, which is higher than its ordinary value, namely 2.050. Which of TiO$_2$ and Ta$_2$O$_5$ to use as the material of the high-refractive-index layers 31H and 32H is determined in consideration of the affinity with the material of the prisms 10 and 20, the affinity with the materials of the low-refractive-index layers 31L and 32L, easiness of film formation, and other factors.

Figure 4:
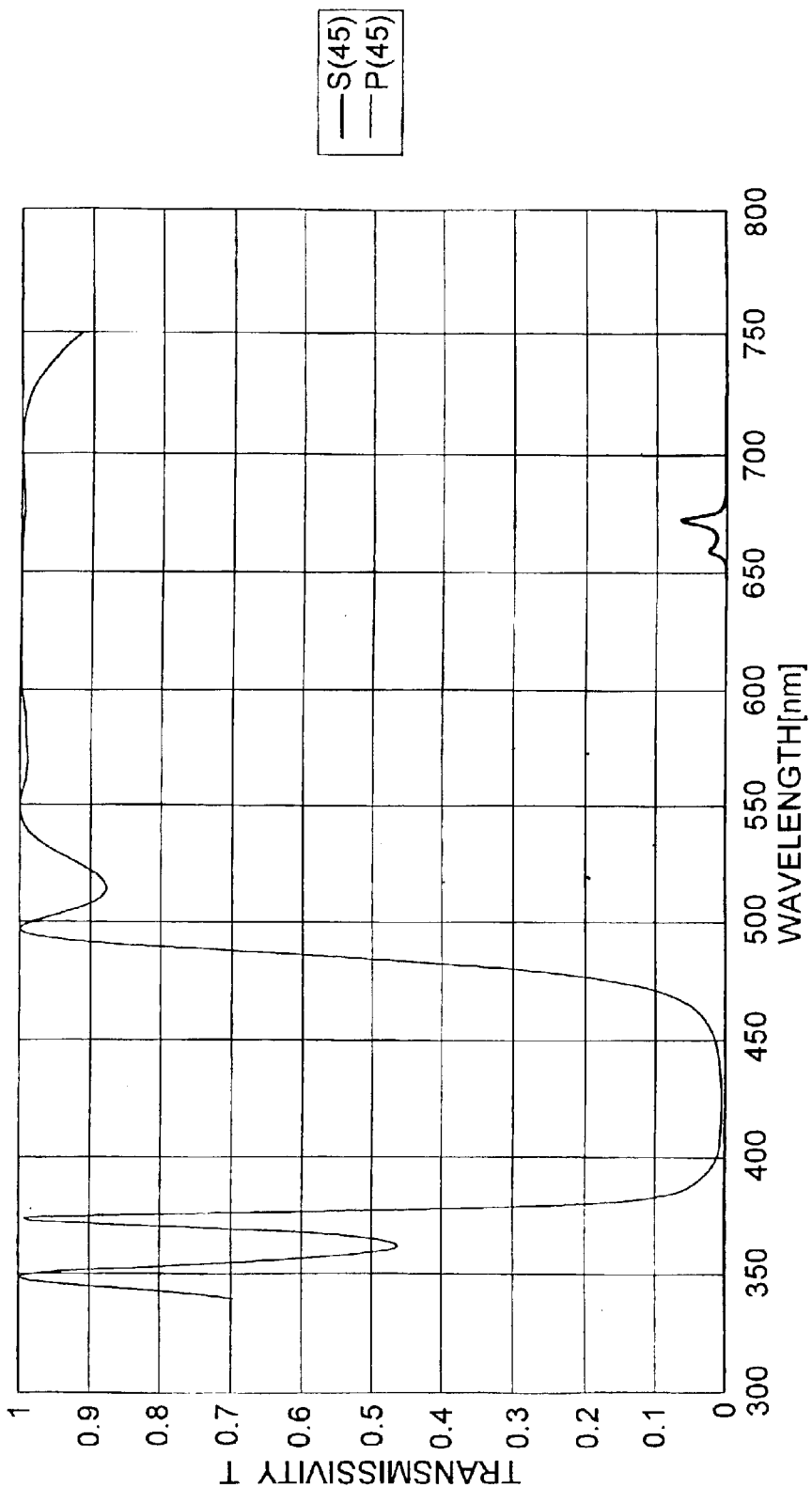
FIG. 4 is a diagram showing the relationship between wavelength and transmissivity observed for the ray that makes an angle of 45° with a normal to the dielectric multilayer film before entering the prism in the polarization beam splitter of Practical Example 1.
Figure 5:
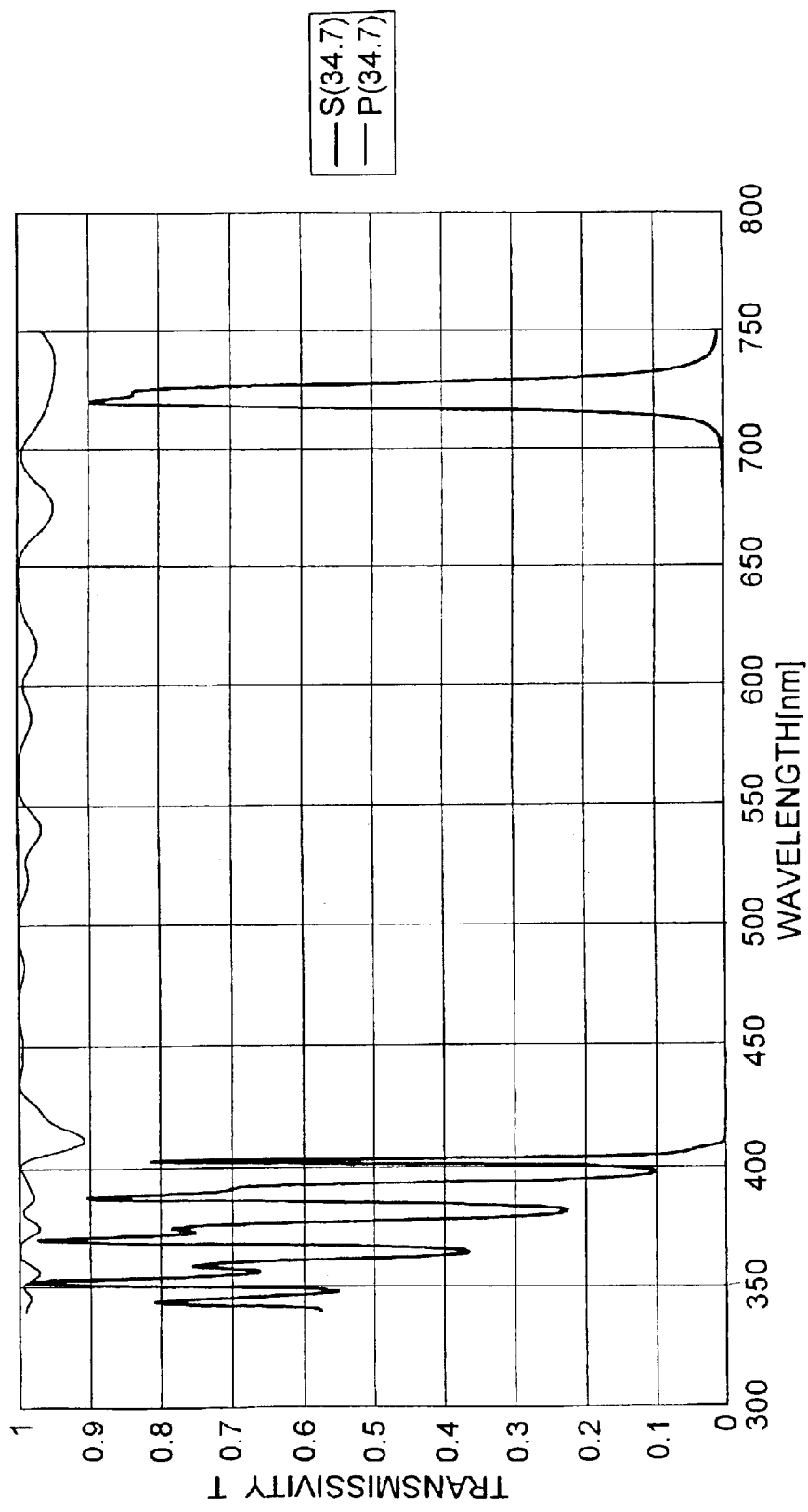
FIG. 5 is a diagram showing the relationship between wavelength and transmissivity observed for the ray that makes an angle of 34.7° with a normal to the dielectric multilayer film before entering the prism in the polarization beam splitter of Practical Example 1.
Figure 6:
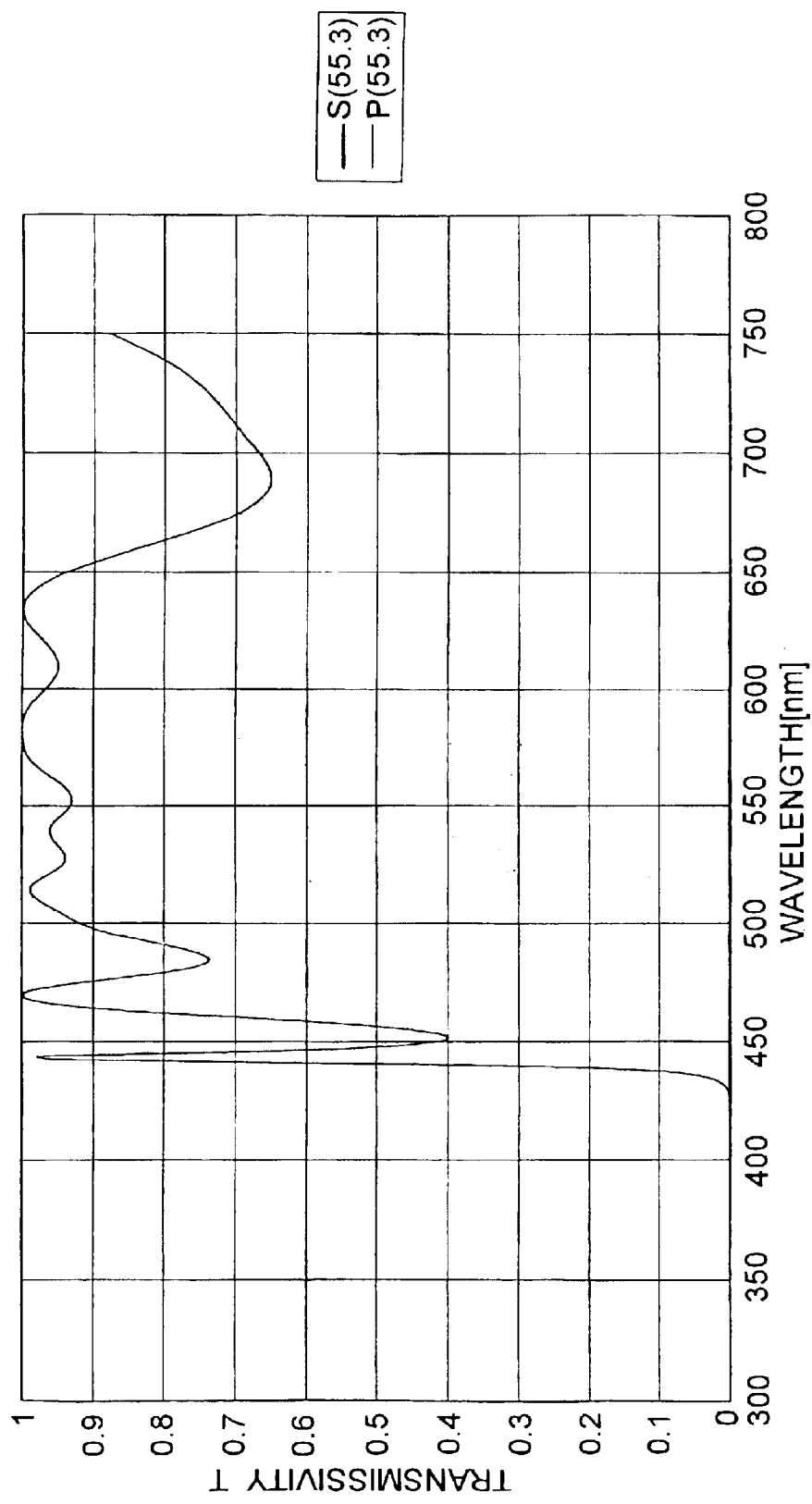
FIG. 6 is a diagram showing the relationship between wavelength and transmissivity observed for the ray that makes an angle of 55.3° with a normal to the dielectric multilayer film before entering the prism in the polarization beam splitter of Practical Example 1.

FIGS. 4 to 6 show the relationship between the wavelength of light and transmissivity as observed in Practical Example 1. In these figures, thick lines represent the transmissivity for S-polarized light, and thin lines represent the transmissivity for P-polarized light. FIG. 4 deals with the ray that makes an angle of 45° with a normal to the dielectric multilayer film 30 before entering the first prism 10 (i.e., in the layer of air). This ray is incident on the dielectric multilayer film 30 at an angle of incidence of 45°. FIG. 5 deals with the ray that makes an angle of 34.7° with a normal to the dielectric multilayer film 30 before entering the first prism 10, and FIG. 6 deals with the ray that makes an angle of 55.3° with a normal to the dielectric multilayer film 30 before entering the first prism 10. These three rays correspond to the principal ray and the two outermost rays of a convergent or divergent beam of light of which the f-number as observed in the layer of air is 2.8 and of which the principal ray makes an angle of 45° with the dielectric multilayer film 30.

As shown in FIG. 4, with the principal ray, which is incident on the dielectric multilayer film at an angle of incidence of 45°, it is possible to separate P- and S-polarized light effectively over a wide wavelength range of from about 480 nm to about 750 nm. Moreover, as shown in FIG. 5, also with the outermost ray that is incident on the dielectric multilayer film at the smallest angle of incidence, effective polarization separation is possible over a wide wavelength range of from about 410 nm to about 720 nm. Furthermore, as shown in FIG. 6, also with the outermost ray that is incident on the dielectric multilayer film at the largest angle of incidence, effective polarization separation is possible over a wavelength range of from about 470 nm to about 670 nm.

Thus, in this practical example, the whole beam of light having an f-number as small as 2.8 can be subjected to effective polarization separation over a wavelength range of from about 480 nm to about 670 nm. Although not shown, with a beam of light having an f-number of 3.5, the whole beam of light can be subjected to effective polarization separation all over the wavelength range of visible light.

PRACTICAL EXAMPLE 2

Table 2 shows an overview of the design of Practical Example 2.

TABLE 2

| | |
|---|---|
| Prism Vertex Angle θ: | 45° |
| Prism Refractive Index Nd: | 1.80 |
| First Multilayer Portion 31 | |
| Number of Units: | 10 |
| First Wavelength λ1: | 720 nm |
| Material of High-Refractive-Index Layers 31H: | A Mixture of TiO$_2$ and |

TABLE 2-continued

| | |
|---|---|
| Material of Low-Refractive-Index Layers 31L: | $La_2O_3$, a Mixture of $TiO_2$ and $La_2O$, or $Ta_2O_5$ MgF$_2$ |
| Refractive Index NH1 of High-Refractive-Index Layers 31H: | 2.050 |
| Refractive Index NL1 of Low-Refractive-Index Layers 31L: | 1.385 |
| Refractive Index Difference \| NH1 − NL1 \|: | 0.665 |
| Angle Difference \| θ1 − θ \|: | 6.520 |
| Second Multilayer Portion 32 | |
| Number of Units: | 11 |
| Second Wavelength λ2: | 864 nm |
| Material of High-Refractive-Index Layers 32H: | $TiO_2$ or $Ta_2O_5$ |
| Material of Low-Refractive-Index Layers 32L: | A Mixture of $Al_2O_3$ and $La_2O_3$ or a Mixture of $Al_2O_3$ and $La_2O$ |
| Refractive Index NH2 of High-Refractive-Index Layers 32H: | 2.200 |
| Refractive Index NL2 of Low-Refractive-Index Layers 32L: | 1.710 |
| Refractive Index Difference \| NH2 − NL2 \|: | 0.490 |
| Angle Difference \| θ2 − θ \|: | 3.142 |
| Wavelength Ratio λ2 / λ1: | 1.200 |

Figure 7:
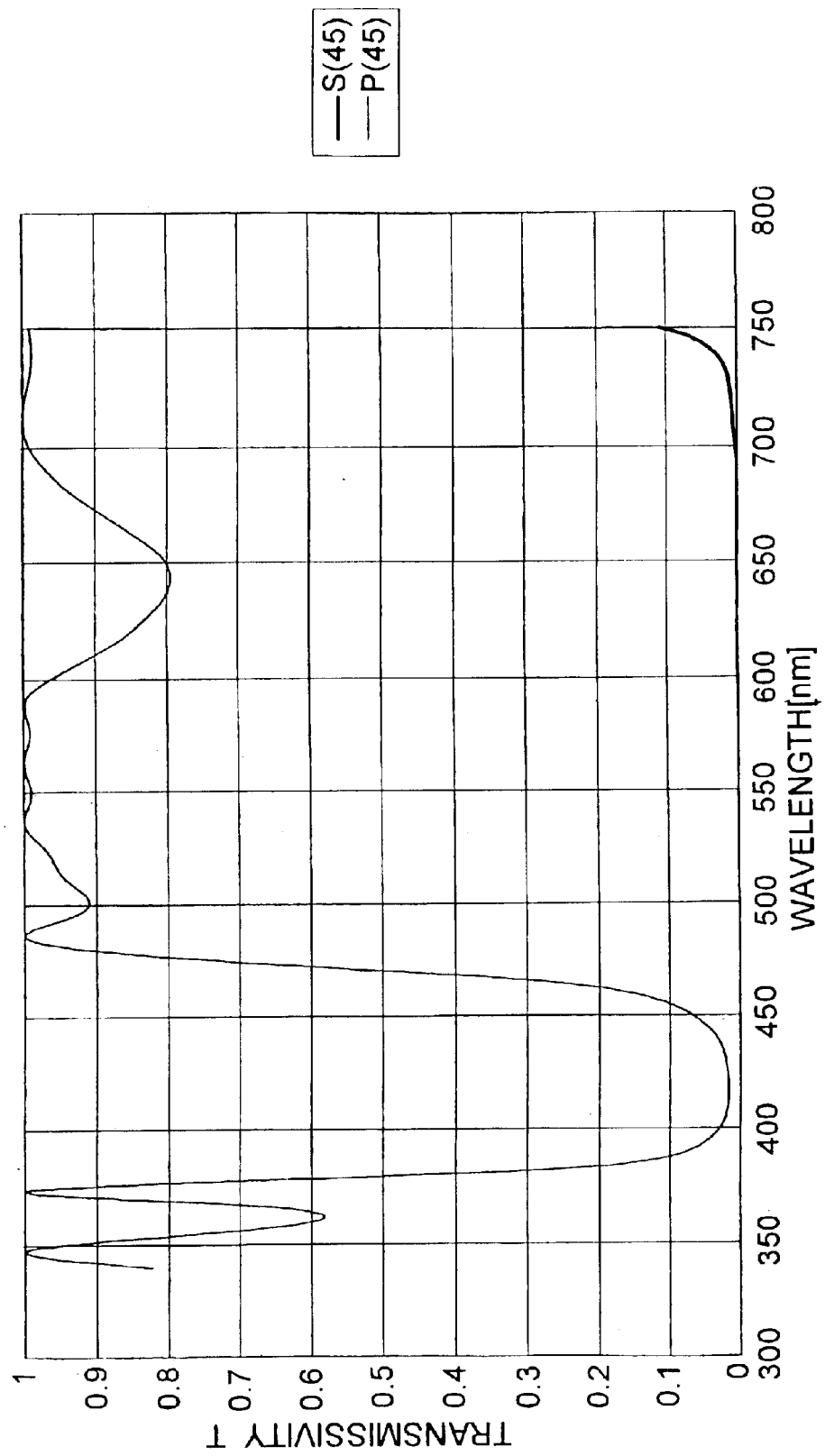
FIG. 7 is a diagram showing the relationship between wavelength and transmissivity observed for the ray that makes an angle of 45° with a normal to the dielectric multilayer film before entering the prism in the polarization beam splitter of Practical Example 2.
Figure 8:
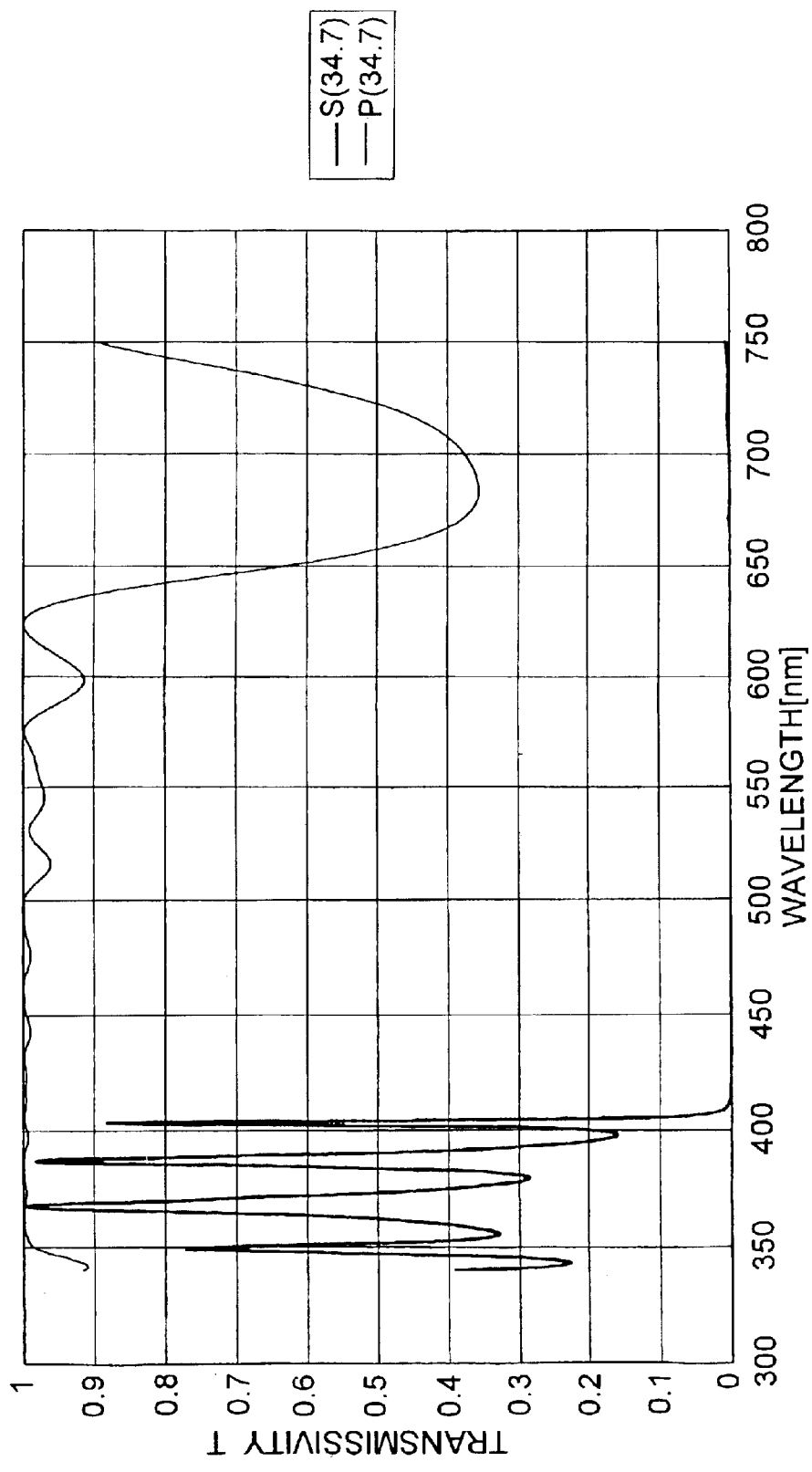
FIG. 8 is a diagram showing the relationship between wavelength and transmissivity observed for the ray that makes an angle of 34.7° with a normal to the dielectric multilayer film before entering the prism in the polarization beam splitter of Practical Example 2.
Figure 9:
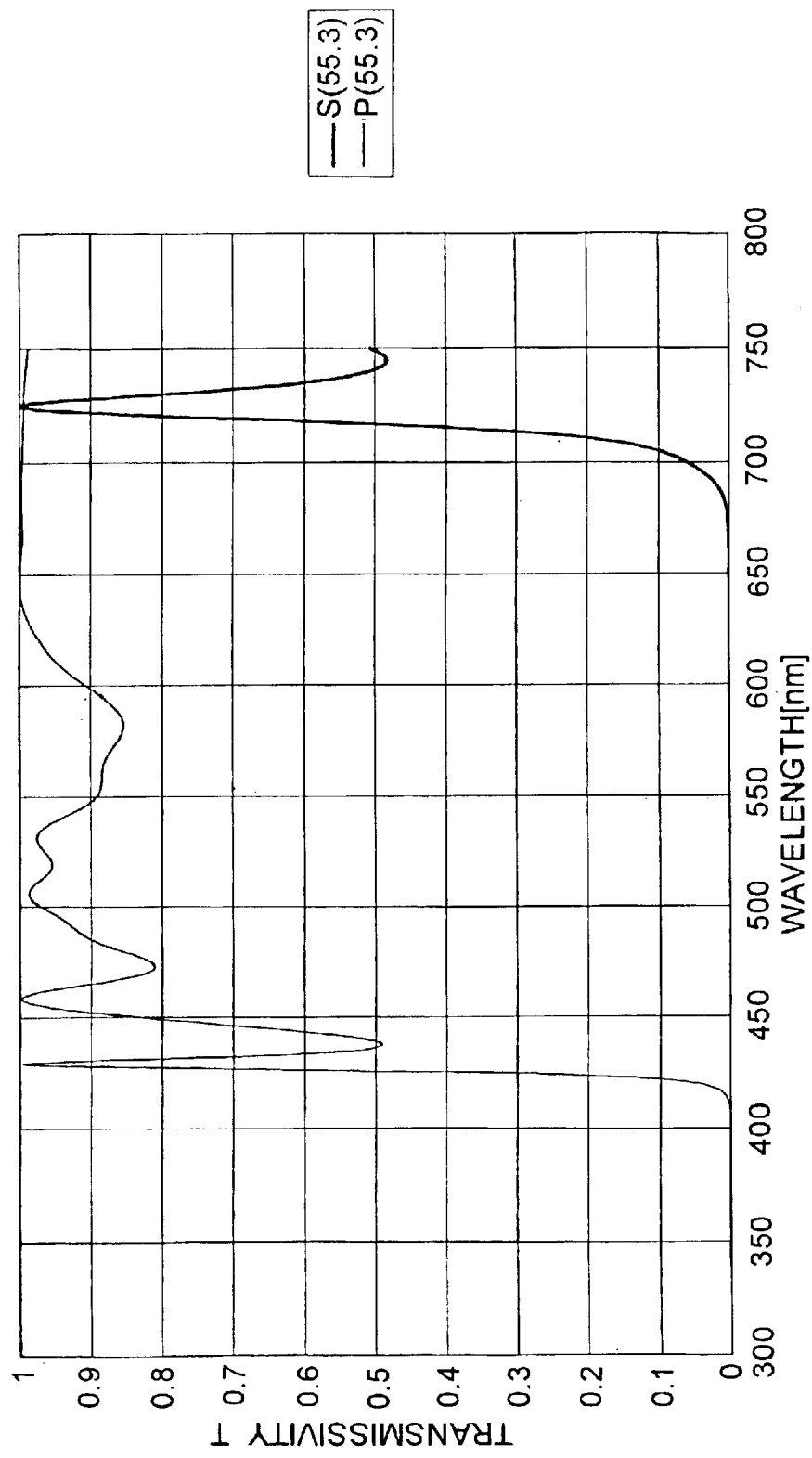
FIG. 9 is a diagram showing the relationship between wavelength and transmissivity observed for the ray that makes an angle of 55.3° with a normal to the dielectric multilayer film before entering the prism in the polarization beam splitter of Practical Example 2.

FIGS. 7 to 9 show the relationship between the wavelength of light and transmissivity as observed in Practical Example 2. In these figures, thick lines represent the transmissivity for S-polarized light, and thin lines represent the transmissivity for P-polarized light. FIG. 7 deals with the ray that makes an angle of 45° with a normal to the dielectric multilayer film 30 before entering the first prism 10. FIG. 8 deals with the ray that makes an angle of 34.7° with a normal to the dielectric multilayer film 30 before entering the first prism 10, and FIG. 9 deals with the ray that makes an angle of 55.3° with a normal to the dielectric multilayer film 30 before entering the first prism 10. As described earlier, these three rays correspond to the principal ray and the two outermost rays of a convergent or divergent beam of light of which the f-number as observed in the layer of air is 2.8 and of which the principal ray makes an angle of 45° with the dielectric multilayer film 30.

As shown in FIG. 7, with the principal ray, which is incident on the dielectric multilayer film at an angle of incidence of 45°, it is possible to separate P- and S-polarized light effectively over a wide wavelength range of from about 480 nm to about 750 nm. Moreover, as shown in FIG. 8, with the outermost ray that is incident on the dielectric multilayer film at the smallest angle of incidence, effective polarization separation is possible over a wavelength range of from about 410 nm to about 650 nm. Furthermore, as shown in FIG. 9, with the outermost ray that is incident on the dielectric multilayer film at the largest angle of incidence, effective polarization separation is possible over a wide wavelength range of from about 450 nm to about 710 nm. Thus, in this practical example, the whole beam of light having an f-number as small as 2.8 can be subjected to effective polarization separation over a wavelength range of from about 480 nm to about 650 nm.

PRACTICAL EXAMPLE 3

Table 3 shows an overview of the design of Practical Example 3.

TABLE 3

| | |
|---|---|
| Prism Vertex Angle θ: | 45° |
| Prism Refractive Index Nd: | 1.70 |
| First Multilayer Portion 31 | |
| Number of Units: | 11 |
| First Wavelength λ1: | 750 nm |
| Material of High-Refractive-Index Layers 31H: | A Mixture of $Al_2O_3$ and $La_2O_3$ or a Mixture of $Al_2O_3$ and $La_2O$ |
| Material of Low-Refractive-Index Layers 31L: | MgF$_2$ |
| Refractive Index NH1 of High-Refractive-Index Layers 31H: | 1.710 |
| Refractive Index NL1 of Low-Refractive-Index Layers 31L: | 1.385 |
| Refractive Index Difference \| NH1 − NL1 \|: | 0.325 |
| Angle Difference \| θ1 − θ \|: | 5.721 |
| Second Multilayer Portion 32 | |
| Number of Units: | 11 |
| Second Wavelength λ2: | 830 nm |
| Material of High-Refractive-Index Layers 32H: | $TiO_2$ or $Ta_2O_5$ |
| Material of Low-Refractive-Index Layers 32L: | $Al_2O_3$ |
| Refractive Index NH2 of High-Refractive-Index Layers 32H: | 2.200 |
| Refractive Index NL2 of Low-Refractive-Index Layers 32L: | 1.620 |
| Refractive Index Difference \| NH2 − NL2 \|: | 0.580 |
| Angle Difference \| θ2 − θ \|: | 6.177 |
| Wavelength Ratio λ2 / λ1: | 1.107 |

Figure 10:
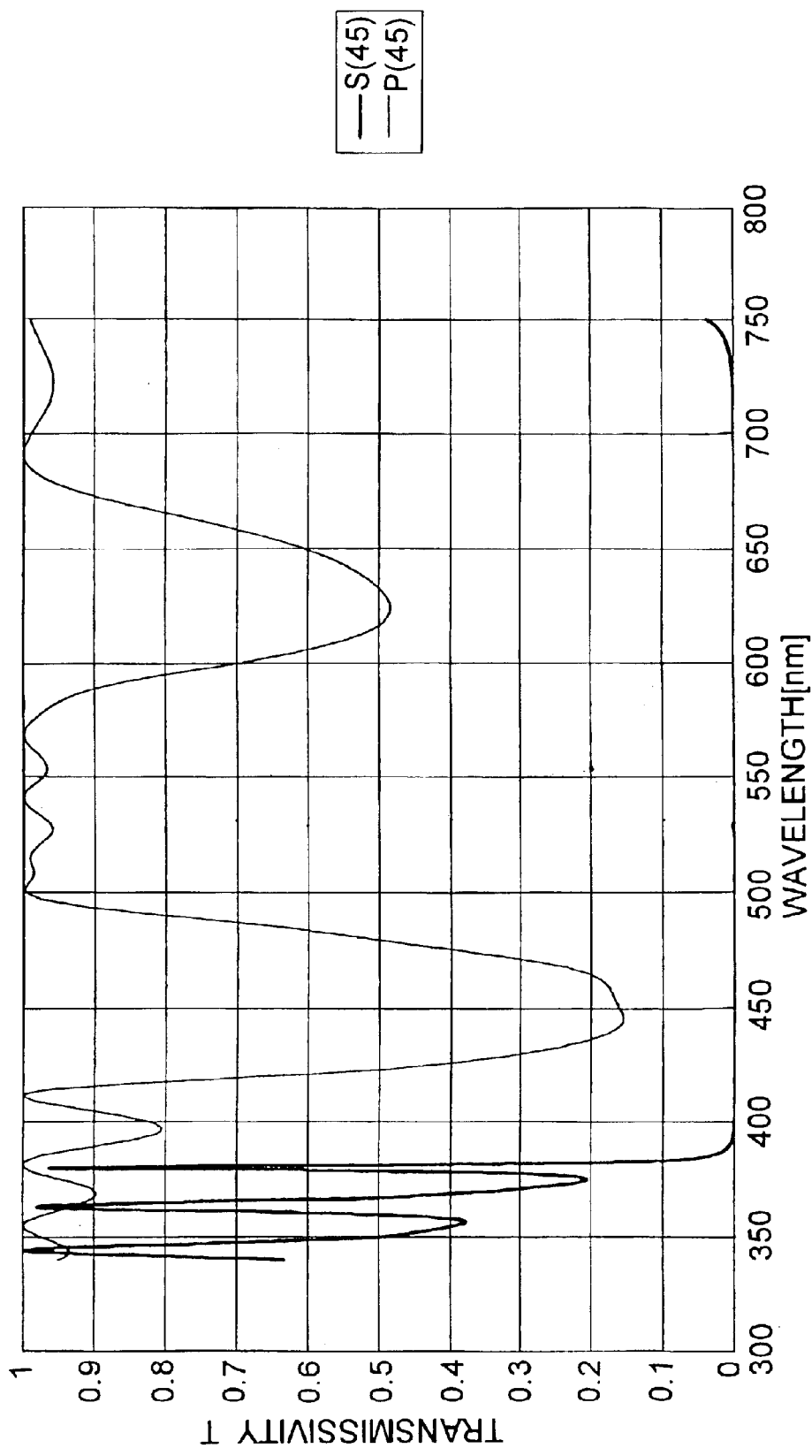
FIG. 10 is a diagram showing the relationship between wavelength and transmissivity observed for the ray that makes an angle of 45° with a normal to the dielectric multilayer film before entering the prism in the polarization beam splitter of Practical Example 3.
Figure 11:
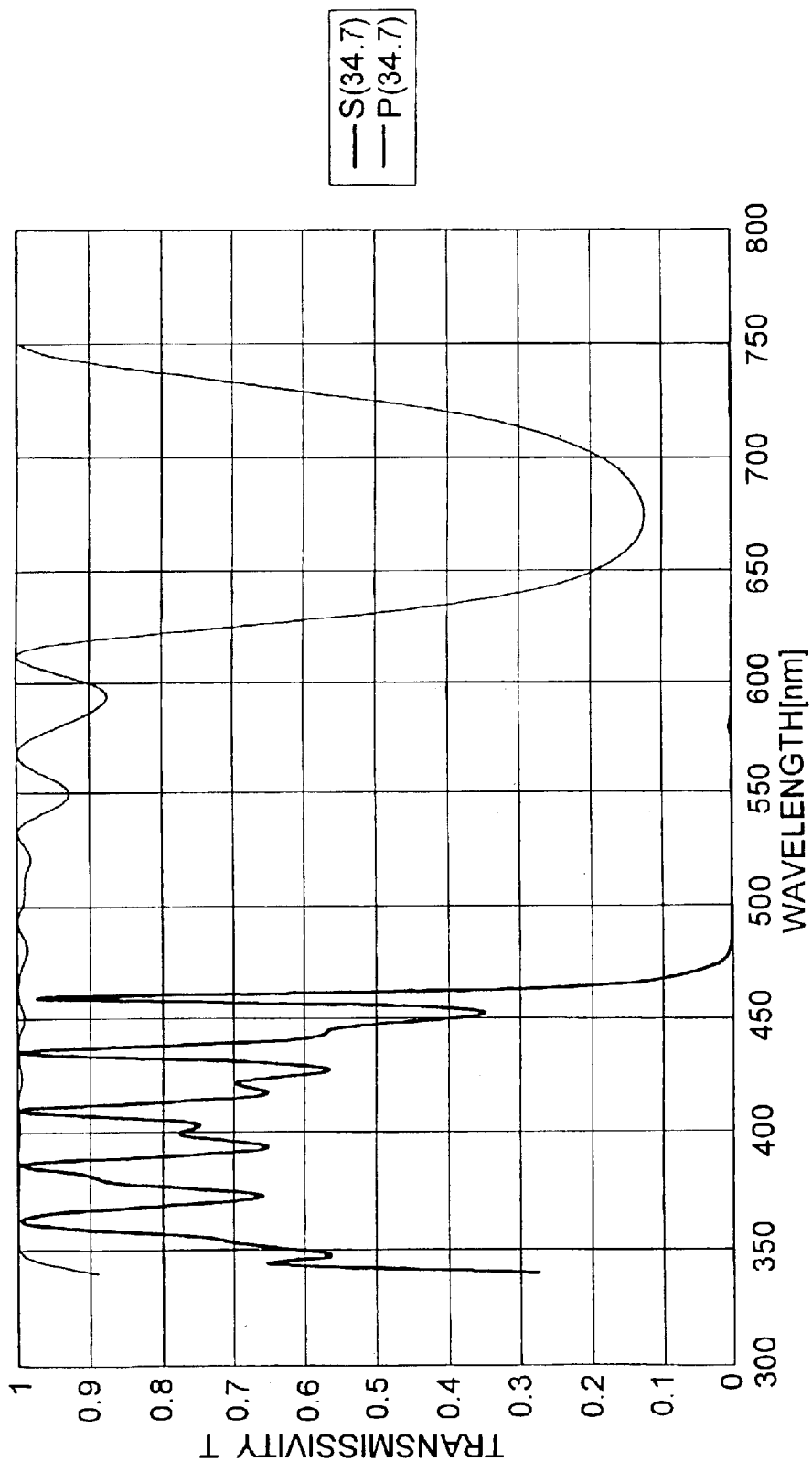
FIG. 11 is a diagram showing the relationship between wavelength and transmissivity observed for the ray that makes an angle of 34.7° with a normal to the dielectric multilayer film before entering the prism in the polarization beam splitter of Practical Example 3.
Figure 12:
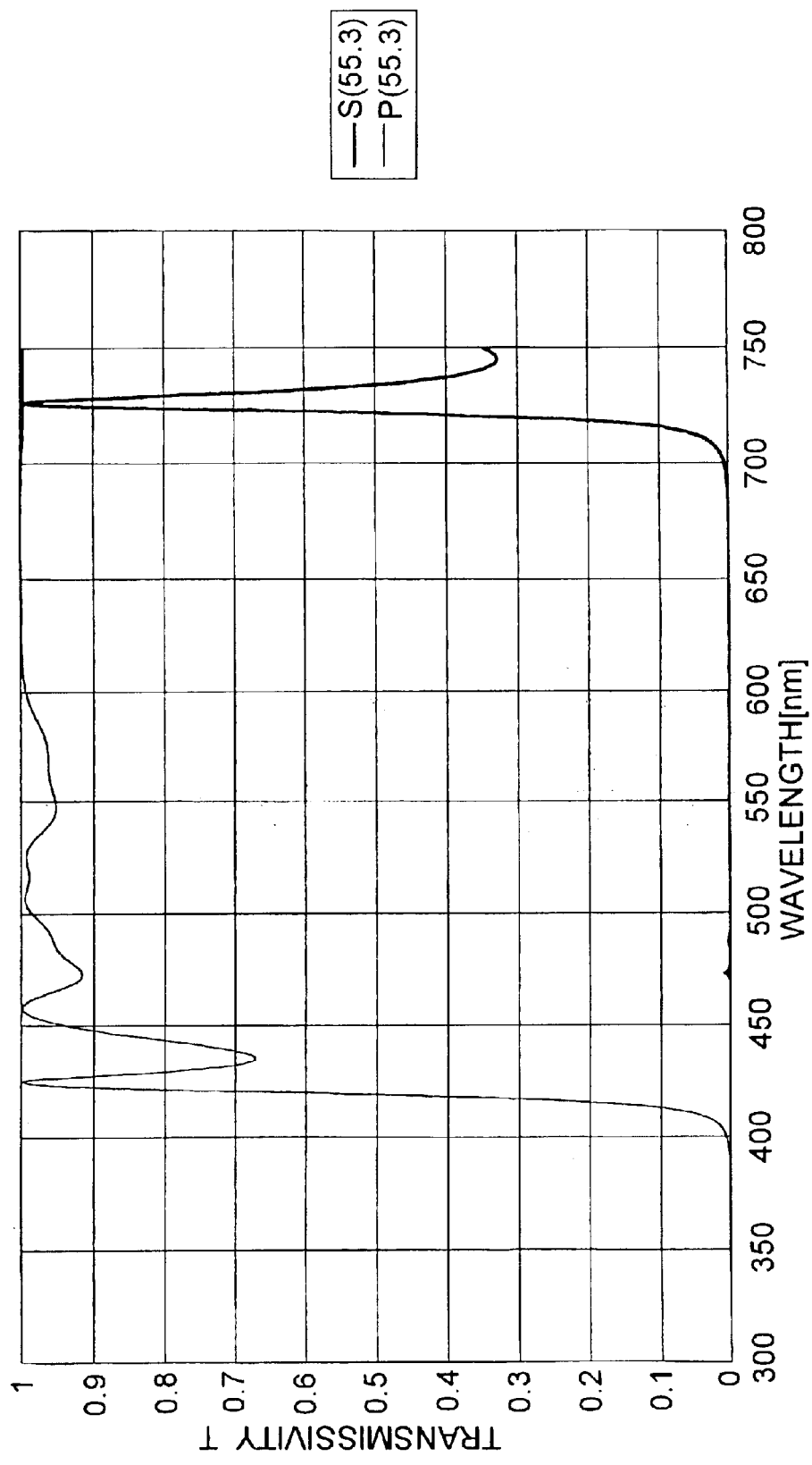
FIG. 12 is a diagram showing the relationship between wavelength and transmissivity observed for the ray that makes an angle of 55.3° with a normal to the dielectric multilayer film before entering the prism in the polarization beam splitter of Practical Example 3.

FIGS. 10 to 12 show the relationship between the wavelength of light and transmissivity as observed in Practical Example 3. In these figures, thick lines represent the transmissivity for S-polarized light, and thin lines represent the transmissivity for P-polarized light. FIG. 10 deals with the ray that makes an angle of 45° with a normal to the dielectric multilayer film 30 before entering the first prism 10. FIG. 11 deals with the ray that makes an angle of 34.7° with a normal to the dielectric multilayer film 30 before entering the first prism 10, and FIG. 12 deals with the ray that makes an angle of 55.3° with a normal to the dielectric multilayer film 30 before entering the first prism 10. As described earlier, these three rays correspond to the principal ray and the two outermost rays of a convergent or divergent beam of light of which the f-number as observed in the layer of air is 2.8 and of which the principal ray makes an angle of 45° with the dielectric multilayer film 30.

As shown in FIG. 10, with the principal ray, which is incident on the dielectric multilayer film at an angle of incidence of 45°, it is possible to separate P- and S-polarized light effectively over a wavelength range of from about 480 nm to about 600 nm. Moreover, as shown in FIG. 11, with the outermost ray that is incident on the dielectric multilayer film at the smallest angle of incidence, effective polarization separation is possible over a wavelength range of from about 470 nm to about 630 nm. Furthermore, as shown in FIG. 12, with the outermost ray that is incident on the dielectric multilayer film at the largest angle of incidence, effective polarization separation is possible over a wide wavelength range of from about 440 nm to about 720 nm. Thus, in this practical example, the whole beam of light having an f-number as small as 2.8 can be subjected to effective polarization separation over a wavelength range of from about 480 nm to about 600 nm.

PRACTICAL EXAMPLE 4

Table 4 shows an overview of the design of Practical Example 4.

TABLE 4

| | |
|---|---|
| Prism Vertex Angle θ: | 45° |
| Prism Refractive Index Nd: | 1.60 |
| First Multilayer Portion 31 | |
| Number of Units: | 11 |
| First Wavelength λ1: | 720 nm |
| Material of High-Refractive-Index Layers 31H: | $Al_2O_3$ |
| Material of Low-Refractive-Index Layers 31L: | $MgF_2$ |
| Refractive Index NH1 of High-Refractive-Index Layers 31H: | 1.620 |
| Refractive Index NL1 of Low-Refractive-Index Layers 31L: | 1.385 |
| Refractive Index Difference \| NH1 − NL1 \|: | 0.235 |
| Angle Difference \| θ1 − θ \|: | 4.074 |
| Second Multilayer Portion 32 | |
| Number of Units: | 13 |
| Second Wavelength λ2: | 850 nm |
| Material of High-Refractive-Index Layers 32H: | $TiO_2$ or $Ta_2O_5$ |
| Material of Low-Refractive-Index Layers 32L: | $SiO_2$ |
| Refractive Index NH2 of High-Refractive-Index Layers 32H: | 2.200 |
| Refractive Index NL2 of Low-Refractive-Index Layers 32L: | 1.460 |
| Refractive Index Difference \| NH2 − NL2 \|: | 0.740 |
| Angle Difference \| θ2 − θ \|: | 4.200 |
| Wavelength Ratio λ2 / λ1: | 1.181 |

Figure 13:
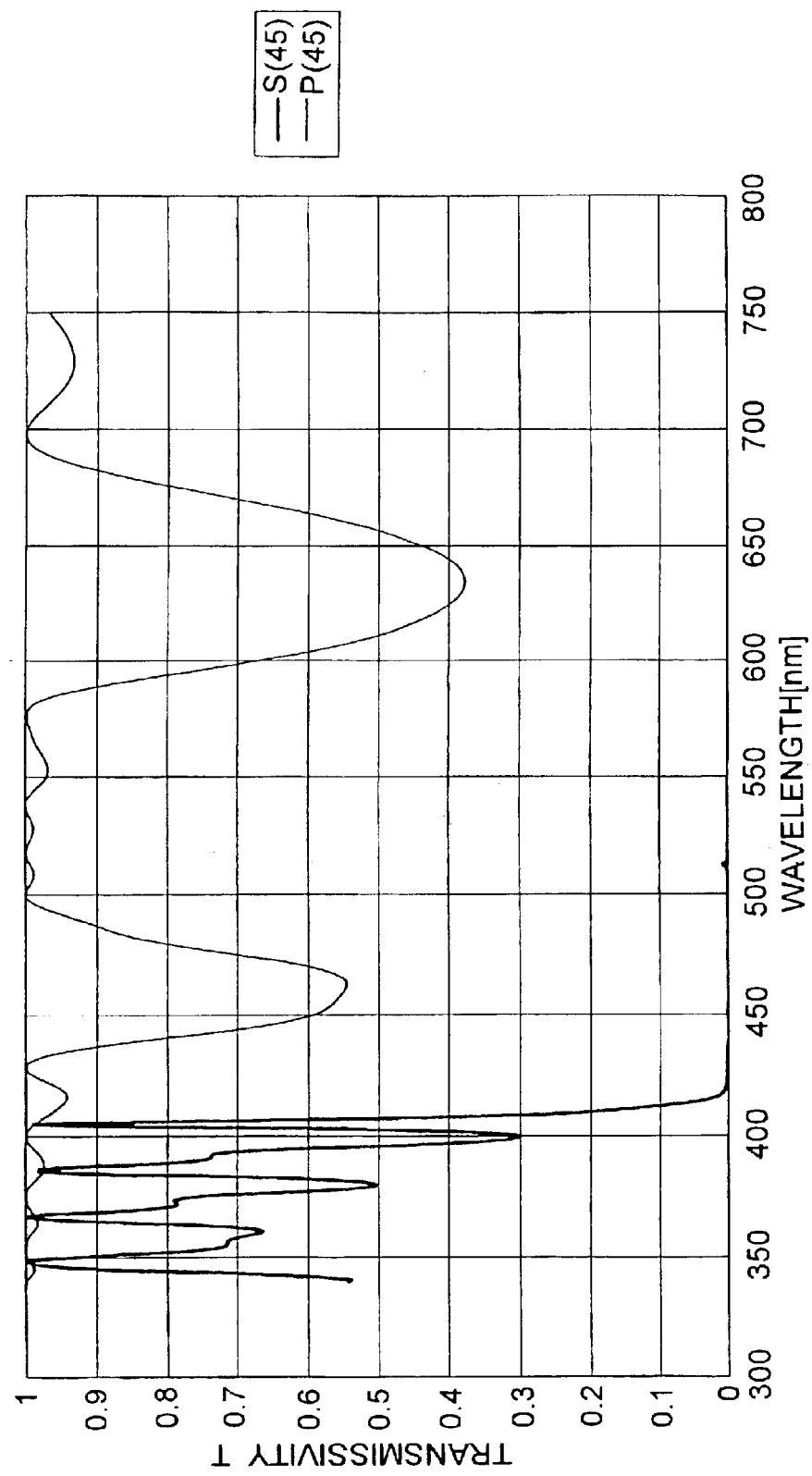
FIG. 13 is a diagram showing the relationship between wavelength and transmissivity observed for the ray that makes an angle of 45° with a normal to the dielectric multilayer film before entering the prism in the polarization beam splitter of Practical Example 4.
Figure 14:
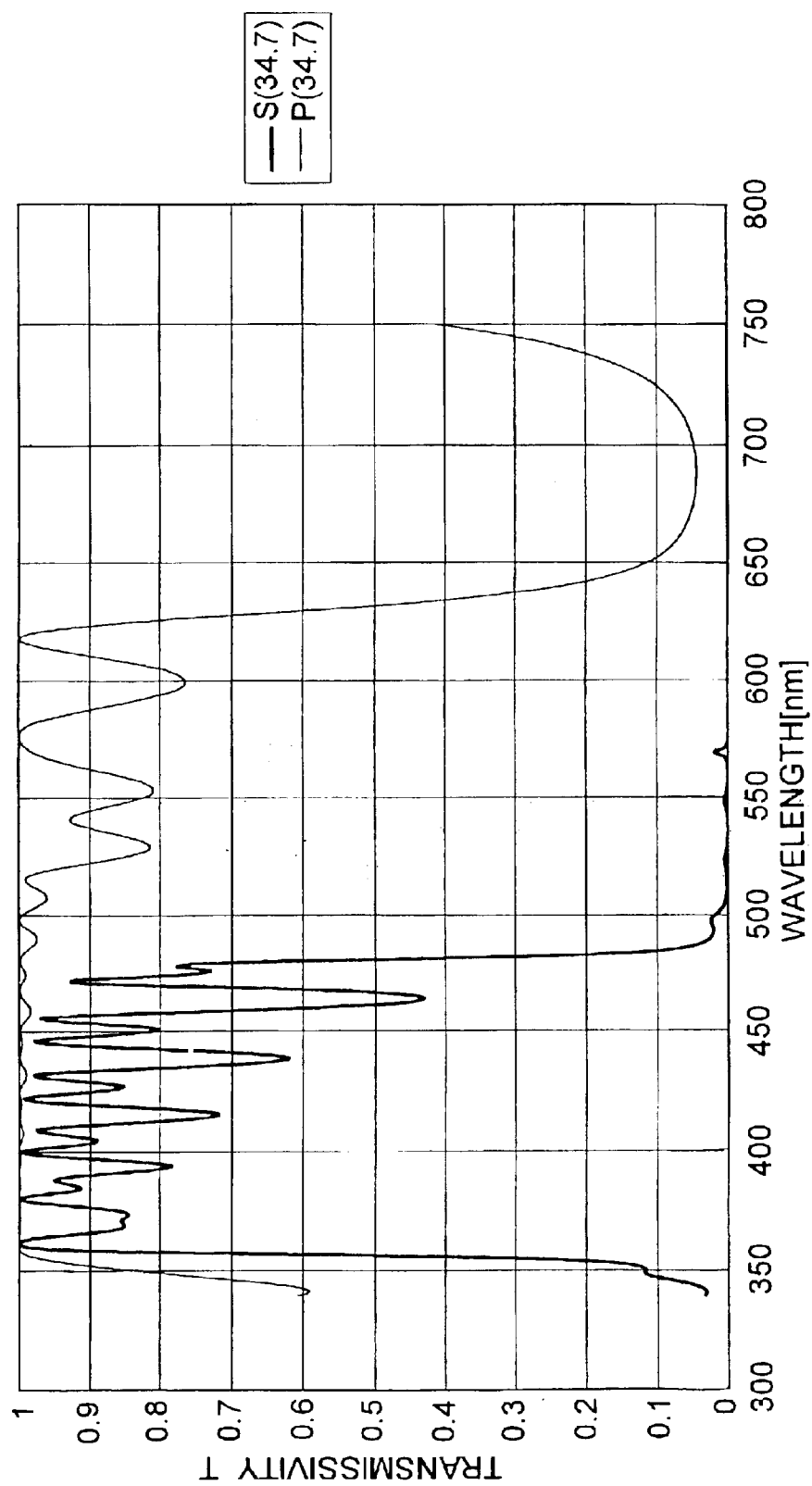
FIG. 14 is a diagram showing the relationship between wavelength and transmissivity observed for the ray that makes an angle of 34.7° with a normal to the dielectric multilayer film before entering the prism in the polarization beam splitter of Practical Example 4.
Figure 15:
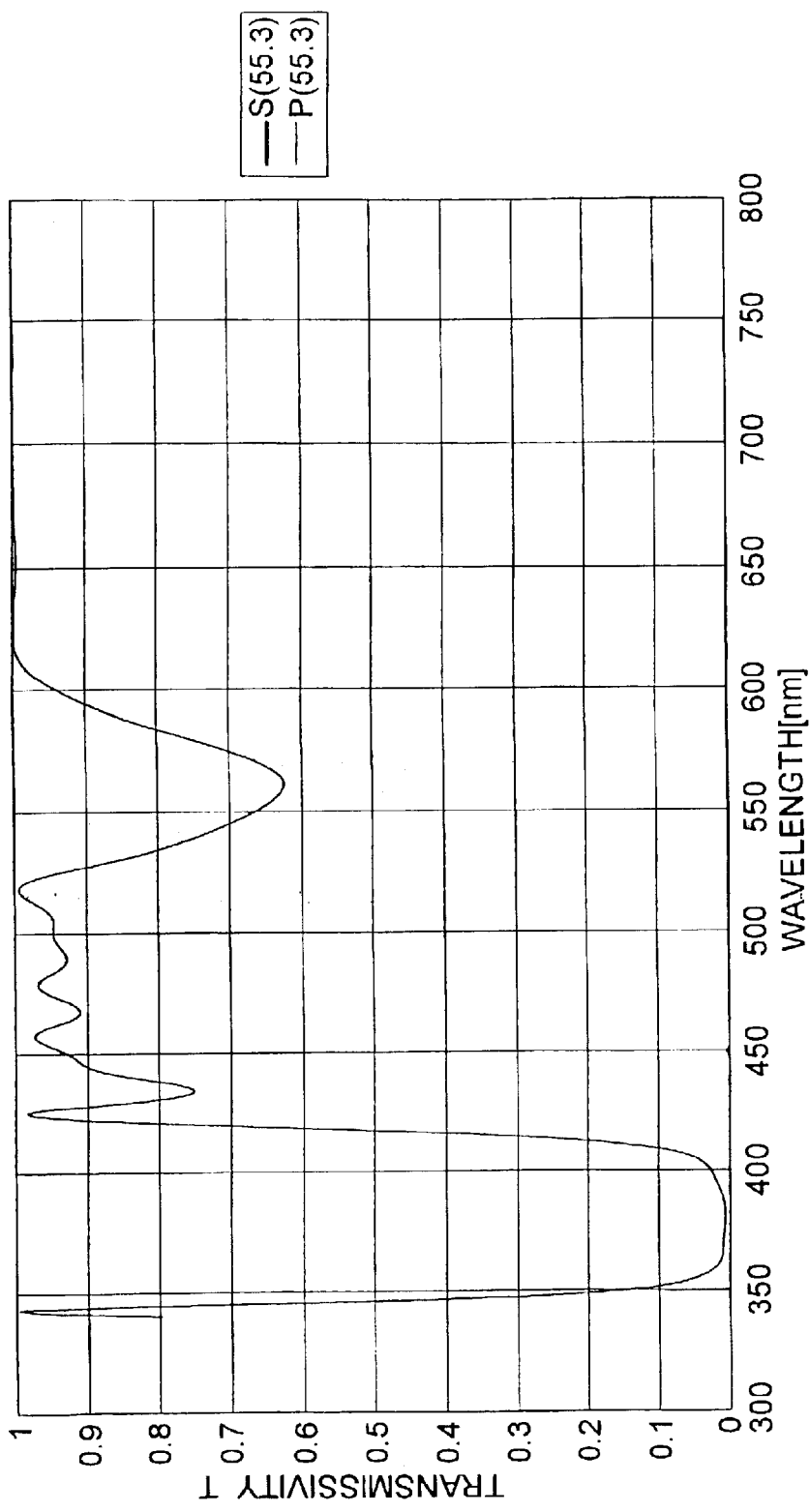
FIG. 15 is a diagram showing the relationship between wavelength and transmissivity observed for the ray that makes an angle of 55.3° with a normal to the dielectric multilayer film before entering the prism in the polarization beam splitter of Practical Example 4.

FIGS. 13 to 15 show the relationship between the wavelength of light and transmissivity as observed in Practical Example 4. In these figures, thick lines represent the transmissivity for S-polarized light, and thin lines represent the transmissivity for P-polarized light. FIG. 13 deals with the ray that makes an angle of 45° with a normal to the dielectric multilayer film 30 before entering the first prism 10. FIG. 14 deals with the ray that makes an angle of 34.7° with a normal to the dielectric multilayer film 30 before entering the first prism 10, and FIG. 15 deals with the ray that makes an angle of 55.3° with a normal to the dielectric multilayer film 30 before entering the first prism 10. As described earlier, these three rays correspond to the principal ray and the two outermost rays of a convergent or divergent beam of light of which the f-number as observed in the layer of air is 2.8 and of which the principal ray makes an angle of 45° with the dielectric multilayer film 30.

As shown in FIG. 13, with the principal ray, which is incident on the dielectric multilayer film at an angle of incidence of 45°, it is possible to separate P- and S-polarized light effectively over a wavelength range of from about 480 nm to about 590 nm. Moreover, as shown in FIG. 14, with the outermost ray that is incident on the dielectric multilayer film at the smallest angle of incidence, effective polarization separation is possible over a wavelength range of from about 480 nm to about 630 nm. Furthermore, as shown in FIG. 15, with the outermost ray that is incident on the dielectric multilayer film at the largest angle of incidence, effective polarization separation is possible over, a wide wavelength range of from about 440 nm to about 750 nm. Thus, in this practical example, the whole beam of light having an f-number as small as 2.8 can be subjected to effective polarization separation over a wavelength range of from about 480 nm to about 590 nm.

PRACTICAL EXAMPLE 5

Table 5 shows an overview of the design of Practical Example 5.

TABLE 5

| | |
|---|---|
| Prism Vertex Angle θ: | 45° |
| Prism Refractive Index Nd: | 1.84 |
| First Multilayer Portion 31 | |
| Number of Units: | 10 |
| First Wavelength λ1: | 740 nm |
| Material of High-Refractive-Index Layers 31H: | $TiO_2$ or $Ta_2O_5$ |
| Material of Low-Refractive-Index Layers 31L: | $MgF_2$ |
| Refractive Index NH1 of High-Refractive-Index Layers 31H: | 2.200 |
| Refractive Index NL1 of Low-Refractive-Index Layers 31L: | 1.385 |
| Refractive Index Difference \| NH1 − NL1 \|: | 0.815 |
| Angle Difference \| θ1 − θ \|: | 5.467 |
| Second Multilayer Portion 32 | |
| Number of Units: | 10 |
| Second Wavelength λ2: | 1147 nm |
| Material of High-Refractive-Index Layers 32H: | $TiO_2$ or $Ta_2O_5$ |
| Material of Low-Refractive-Index Layers 32L: | A Mixture of $Al_2O_3$ and $La_2O_3$ or a Mixture of $Al_2O_3$ and $La_2O$ |
| Refractive Index NH2 of High-Refractive-Index Layers 32H: | 2.200 |
| Refractive Index NL2 of Low-Refractive-Index Layers 32L: | 1.710 |
| Refractive Index Difference \| NH2 − NL2 \|: | 0.490 |
| Angle Difference \| θ2 − θ \|: | 2.156 |
| Wavelength Ratio λ2 / λ1: | 1.550 |

Figure 16:
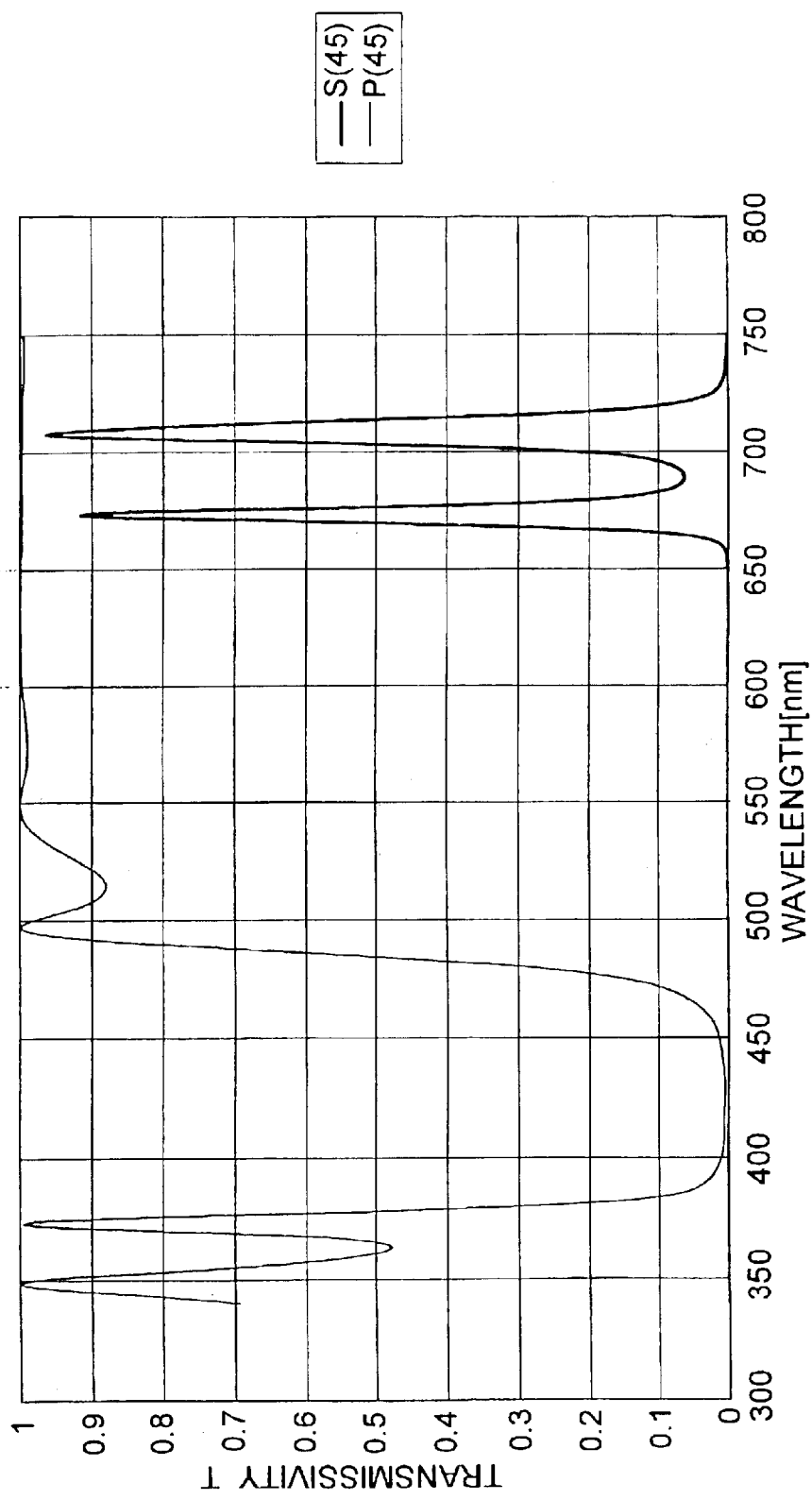
FIG. 16 is a diagram showing the relationship between wavelength and transmissivity observed for the ray that makes an angle of 45° with a normal to the dielectric multilayer film before entering the prism in the polarization beam splitter of Practical Example 5.
Figure 17:
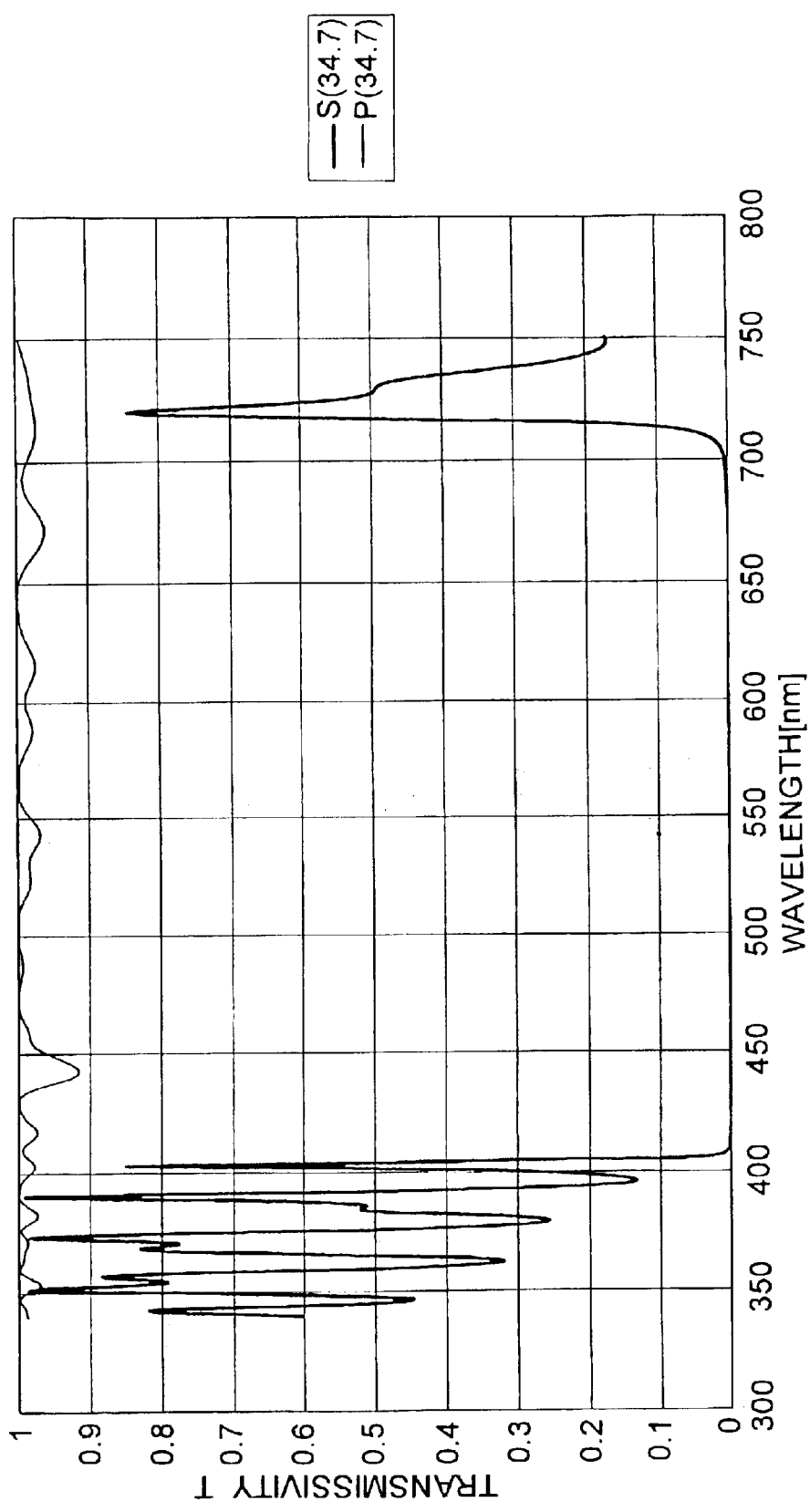
FIG. 17 is a diagram showing the relationship between wavelength and transmissivity observed for the ray that makes an angle of 34.7° with a normal to the dielectric multilayer film before entering the prism in the polarization beam splitter of Practical Example 5.
Figure 18:
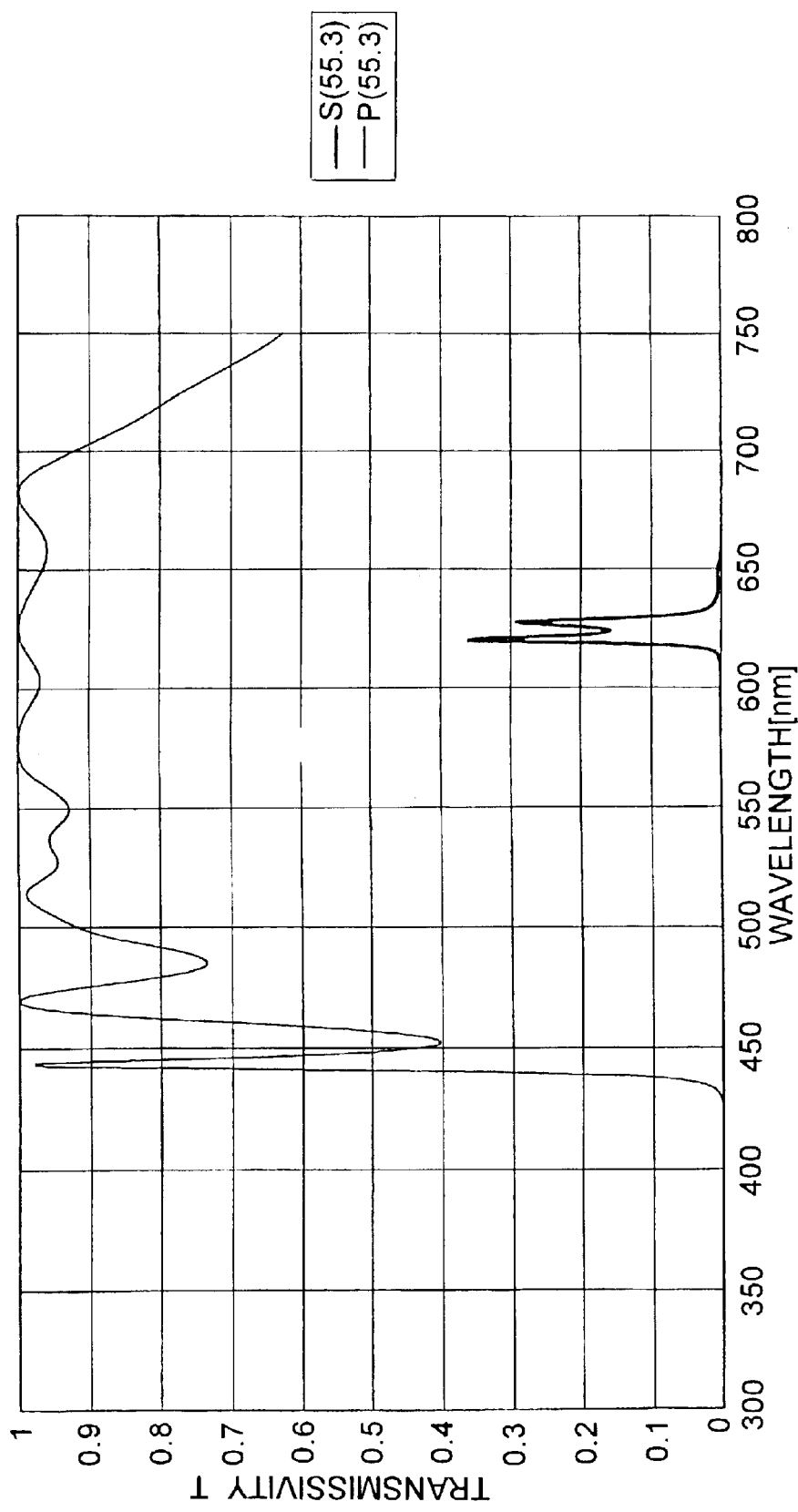
FIG. 18 is a diagram showing the relationship between wavelength and transmissivity observed for the ray that makes an angle of 55.3° with a normal to the dielectric multilayer film before entering the prism in the polarization beam splitter of Practical Example 5.

The design of this practical example is the same as that of Practical Example 1 except for the second wavelength λ2, with the result that here the wavelength ratio λ2/λ1 is 1.550. FIGS. 16 to 18 show the relationship between the wavelength of light and transmissivity as observed in Practical Example 5. In these figures, thick lines represent the transmissivity for S-polarized light, and thin lines represent the transmissivity for P-polarized light. FIG. 16 deals with the ray that makes an angle of 45° with a normal to the dielectric multilayer film 30 before entering the first prism 10. FIG. 17 deals with the ray that makes an angle of 34.7° with a normal to the dielectric multilayer film 30 before entering the first prism 10, and FIG. 18 deals with the ray that makes an angle of 55.3° with a normal to the dielectric multilayer film 30 before entering the first prism 10. As described earlier, these three rays correspond to the principal ray and the two outermost rays of a convergent or divergent beam of light of which the f-number as observed in the layer of air is 2.8 and of which the principal ray makes an angle of 45° with the dielectric multilayer film 30.

As shown in FIG. 16, with the principal ray, which is incident on the dielectric multilayer film at an angle of incidence of 45°, it is possible to separate P- and S-polarized light effectively over a wavelength range of from about 490 nm to about 670 nm. Moreover, as shown in FIG. 17, with the outermost ray that is incident on the dielectric multilayer film at the smallest angle of incidence, effective polarization separation is possible over a wide wavelength range of from about 410 nm to about 720 nm. Furthermore, as shown in FIG. 18, with the outermost ray that is incident on the dielectric multilayer film at the largest angle of incidence, effective polarization separation is possible over a wavelength range of from about 470 nm to about 720 nm, excluding the wavelength range of from about 620 nm to about 630 nm.

Thus, in this practical example, the whole beam of light having an f-number as small as 2.8 can be subjected to largely effective polarization separation over a wavelength range of from about 480 nm to about 720 nm. In the wavelength range of from about 620 nm to about 630 nm, however, when the angle of incidence with respect to the dielectric multilayer film is large, some S-polarized light is transmitted. This transmission of S-polarized light can be reduced to almost zero (not shown) by increasing the f-number to 3.5, but it can safely be said that it is preferable to restrict the wavelength ratio λ2/λ1 to 1.55 or lower when a beam of light having an f-number of about 3 or less is to be subjected to polarization separation.

PRACTICAL EXAMPLE 6

Table 6 shows an overview of the design of Practical Example 6.

TABLE 6

| | |
|---|---|
| Prism Vertex Angle θ: | 45° |
| Prism Refractive Index Nd: | 1.84 |
| First Multilayer Portion 31 | |
| Number of Units: | 10 |
| First Wavelength λ1: | 740 nm |
| Material of High-Refractive-Index Layers 31H: | TiO$_2$ or Ta$_2$O$_5$ |
| Material of Low-Refractive-Index Layers 31L: | SiO$_2$ |
| Refractive Index NH1 of High-Refractive-Index Layers 31H: | 2.200 |
| Refractive Index NL1 of Low-Refractive-Index Layers 31L: | 1.460 |
| Refractive Index Difference \| NH1 − NL1 \|: | 0.740 |
| Angle Difference \| θ1 − θ \|: | 3.652 |
| Second Multilayer Portion 32 | |
| Number of Units: | 10 |
| Second Wavelength λ2: | 1132.2 nm |
| Material of High-Refractive-Index Layers 32H: | TiO$_2$ or Ta$_2$O$_5$ |
| Material of Low-Refractive-Index Layers 32L: | Al$_2$O$_3$ |
| Refractive Index NH2 of High-Refractive-Index Layers 32H: | 2.200 |
| Refractive Index NL2 of Low-Refractive-Index Layers 32L: | 1.620 |
| Refractive Index Difference \| NH2 − NL2 \|: | 0.580 |
| Angle Difference \| θ2 − θ \|: | 0.107 |
| Wavelength Ratio λ2 / λ1: | 1.530 |

Figure 19:
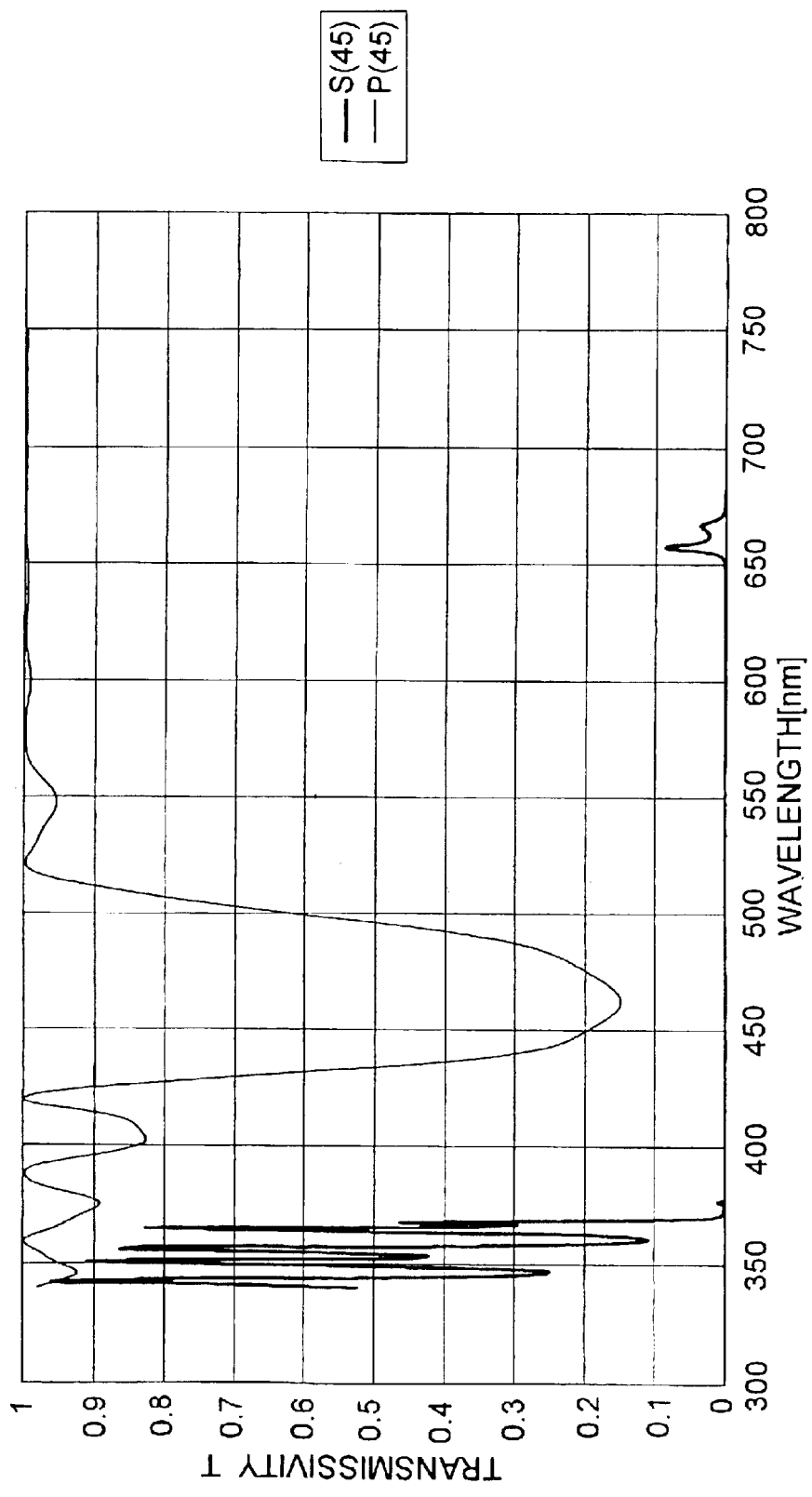
FIG. 19 is a diagram showing the relationship between wavelength and transmissivity observed for the ray that makes an angle of 45° with a normal to the dielectric multilayer film before entering the prism in the polarization beam splitter of Practical Example 6.
Figure 20:
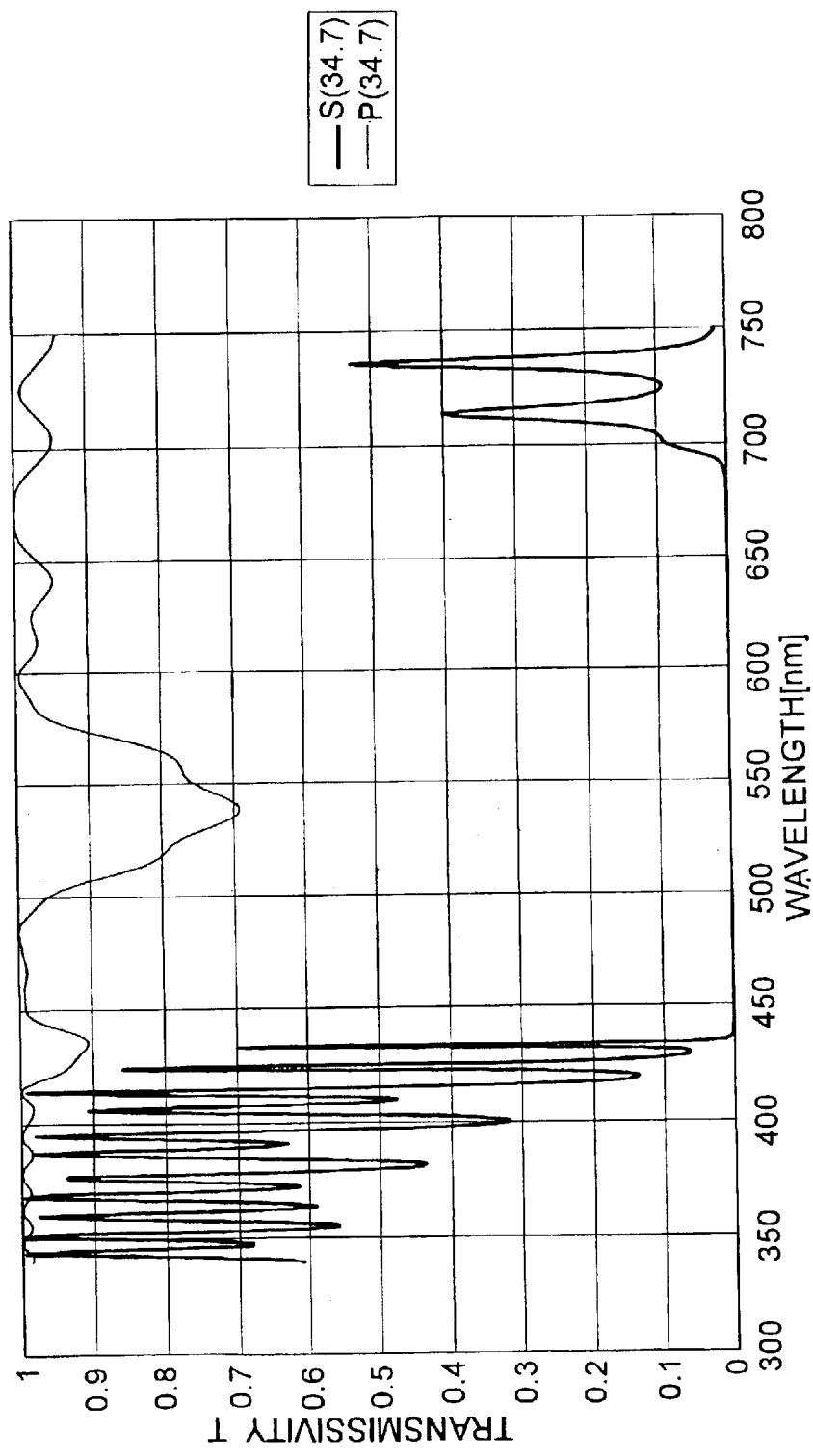
FIG. 20 is a diagram showing the relationship between wavelength and transmissivity observed for the ray that makes an angle of 34.7° with a normal to the dielectric multilayer film before entering the prism in the polarization beam splitter of Practical Example 6.
Figure 21:
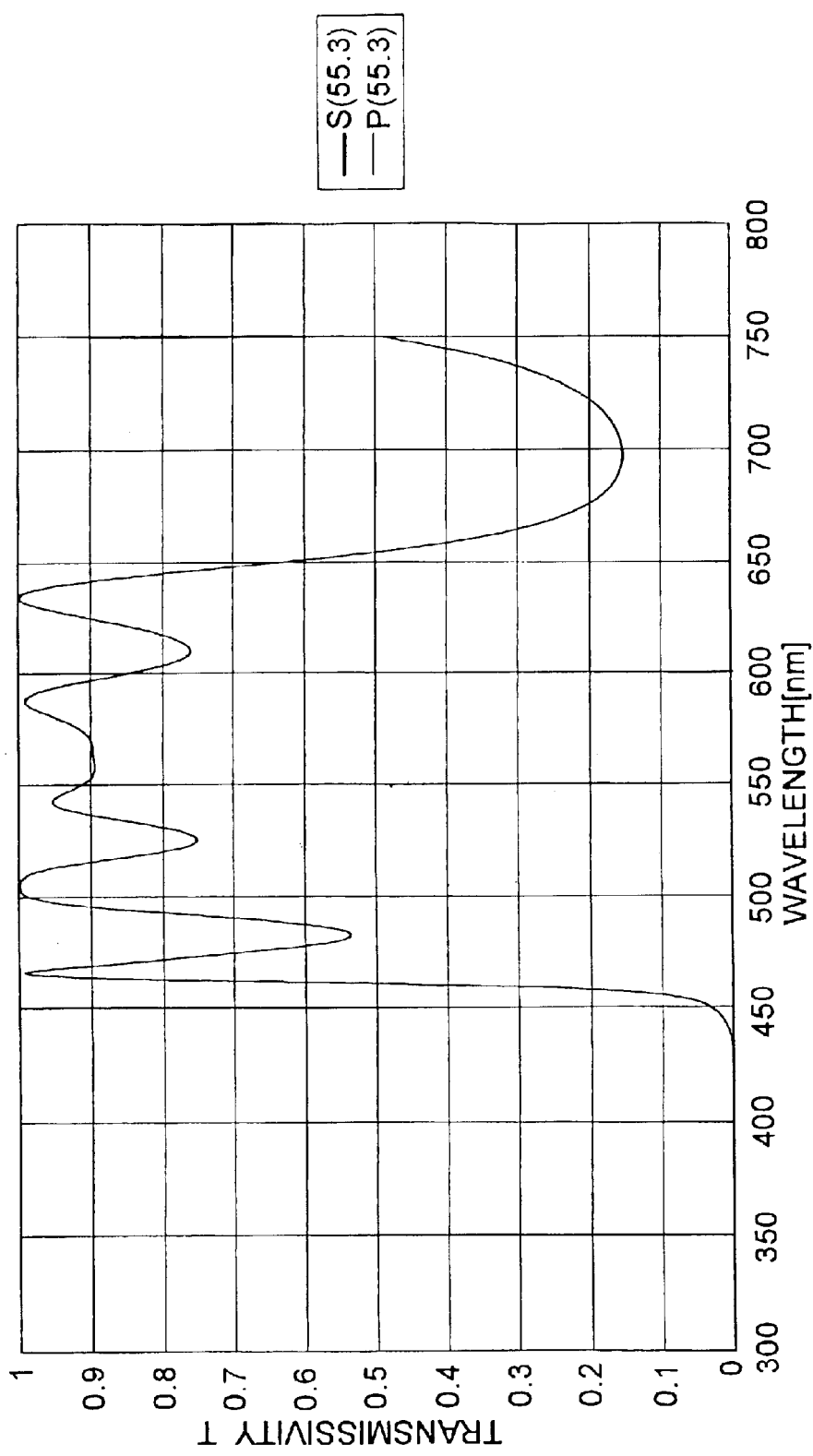
FIG. 21 is a diagram showing the relationship between wavelength and transmissivity observed for the ray that makes an angle, of 55.3° with a normal to the dielectric multilayer film before entering the prism in the polarization beam splitter of Practical Example 6.

FIGS. 19 to 21 show the relationship between the wavelength of light and transmissivity as observed in Practical Example 6. In these figures, thick lines represent the transmissivity for S-polarized light, and thin lines represent the transmissivity for P-polarized light. FIG. 19 deals with the ray that makes an angle of 45° with a normal to the dielectric multilayer film 30 before entering the first prism 10. FIG. 20 deals with the ray that makes an angle of 34.7° with a normal to the dielectric multilayer film 30 before entering the first prism 10, and FIG. 21 deals with the ray that makes an angle of 55.3° with a normal to the dielectric multilayer film 30 before entering the first prism 10. As described earlier, these three rays correspond to the principal ray and the two outermost rays of a convergent or divergent beam of light of which the f-number as observed in the layer of air is 2.8 and of which the principal ray makes an angle of 45° with the dielectric multilayer film 30.

As shown in FIG. 19, with the principal ray, which is incident on the dielectric multilayer film at an angle of incidence of 45°, it is possible to separate P- and S-polarized light effectively over a wavelength range of from about 510 nm to about 750 nm. Moreover, as shown in FIG. 20, with the outermost ray that is incident on the dielectric multilayer film at the smallest angle of incidence, effective polarization separation is possible over a wide wavelength range of from about 430 nm to about 720 nm. Furthermore, as shown in FIG. 21, with the outermost ray that is incident on the dielectric multilayer film at the largest angle of incidence, effective polarization separation is possible over a wavelength range of from about 480 nm to about 640 nm. Thus, in this practical example, the whole beam of light having an f-number as small as 2.8 can be subjected to effective polarization separation over a wavelength range of from about 510 nm to about 640 nm.

PRACTICAL EXAMPLE 7

Table 7 shows an overview of the design of Practical Example 7.

TABLE 7

| | |
|---|---|
| Prism Vertex Angle θ: | 45° |
| Prism Refractive Index Nd: | 1.80 |
| First Multilayer Portion 31 | |
| Number of Units: | 10 |
| First Wavelength λ1: | 740 nm |
| Material of High-Refractive-Index Layers 31H: | TiO$_2$ or Ta$_2$O$_5$ |
| Material of Low-Refractive-Index Layers 31L: | SiO$_2$ |
| Refractive Index NH1 of High-Refractive-Index Layers 31H: | 2.200 |
| Refractive Index NL1 of Low-Refractive-Index Layers 31L: | 1.460 |
| Refractive Index Difference \| NH1 − NL1 \|: | 0.740 |
| Angle Difference \| θ1 − θ \|: | 2.630 |
| Second Multilayer Portion 32 | |
| Number of Units: | 11 |
| Second Wavelength λ2: | 1117.4 nm |
| Material of High-Refractive-Index Layers 32H: | TiO$_2$ or Ta$_2$O$_5$ |
| Material of Low-Refractive-Index Layers 32L: | Al$_2$O$_3$ |
| Refractive Index NH2 of High-Refractive-Index Layers 32H: | 2.200 |
| Refractive Index NL2 of Low-Refractive-Index Layers 32L: | 1.620 |
| Refractive Index Difference \| NH2 − NL2 \|: | 0.580 |
| Angle Difference \| θ2 − θ \|: | 1.275 |
| Wavelength Ratio λ2 / λ1: | 1.510 |

Figure 22:
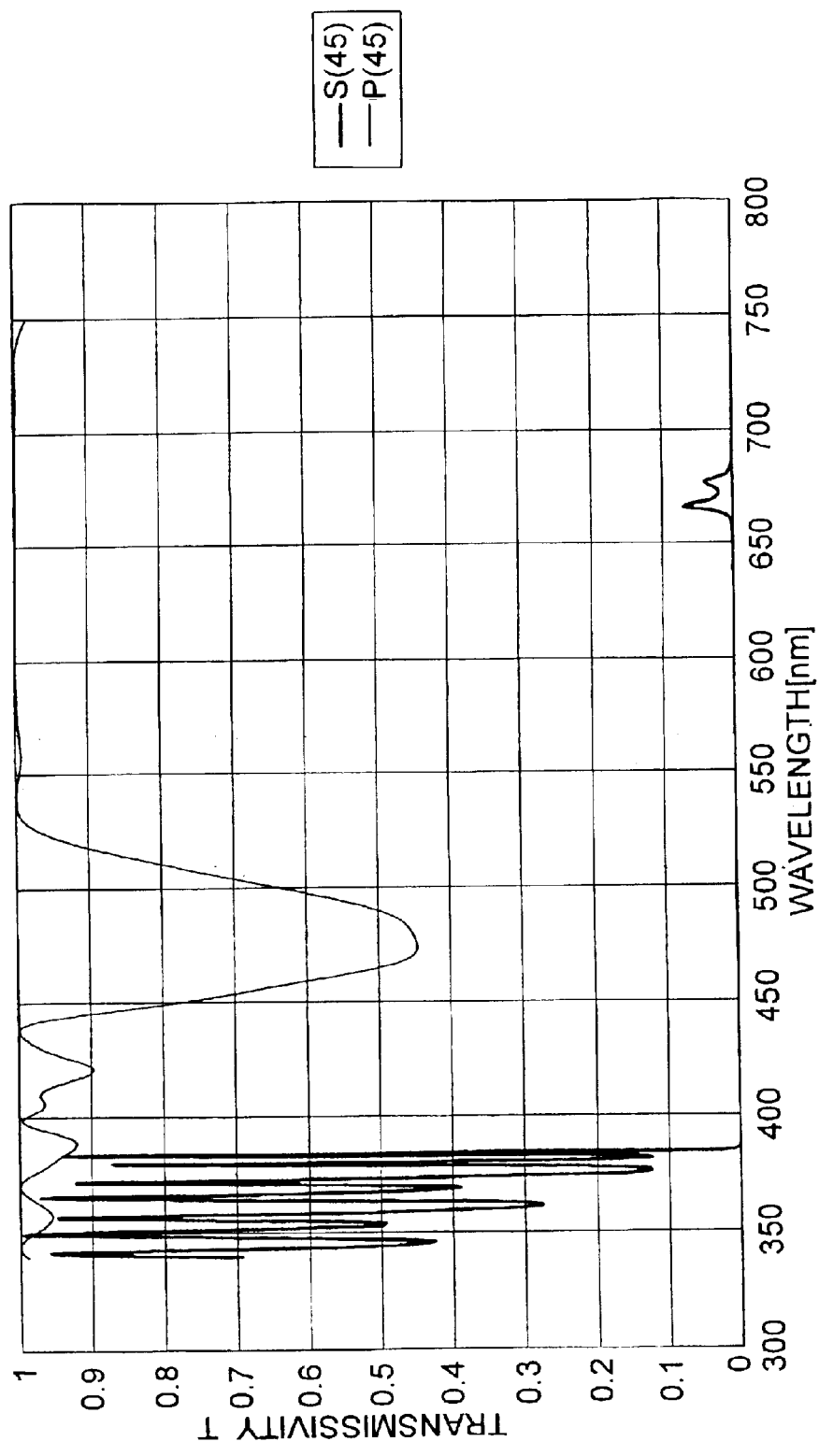
FIG. 22 is a diagram showing the relationship between wavelength and transmissivity observed for the ray that makes an angle of 45° with a normal to the dielectric multilayer film before entering the prism in the polarization beam splitter of Practical Example 7.
Figure 23:
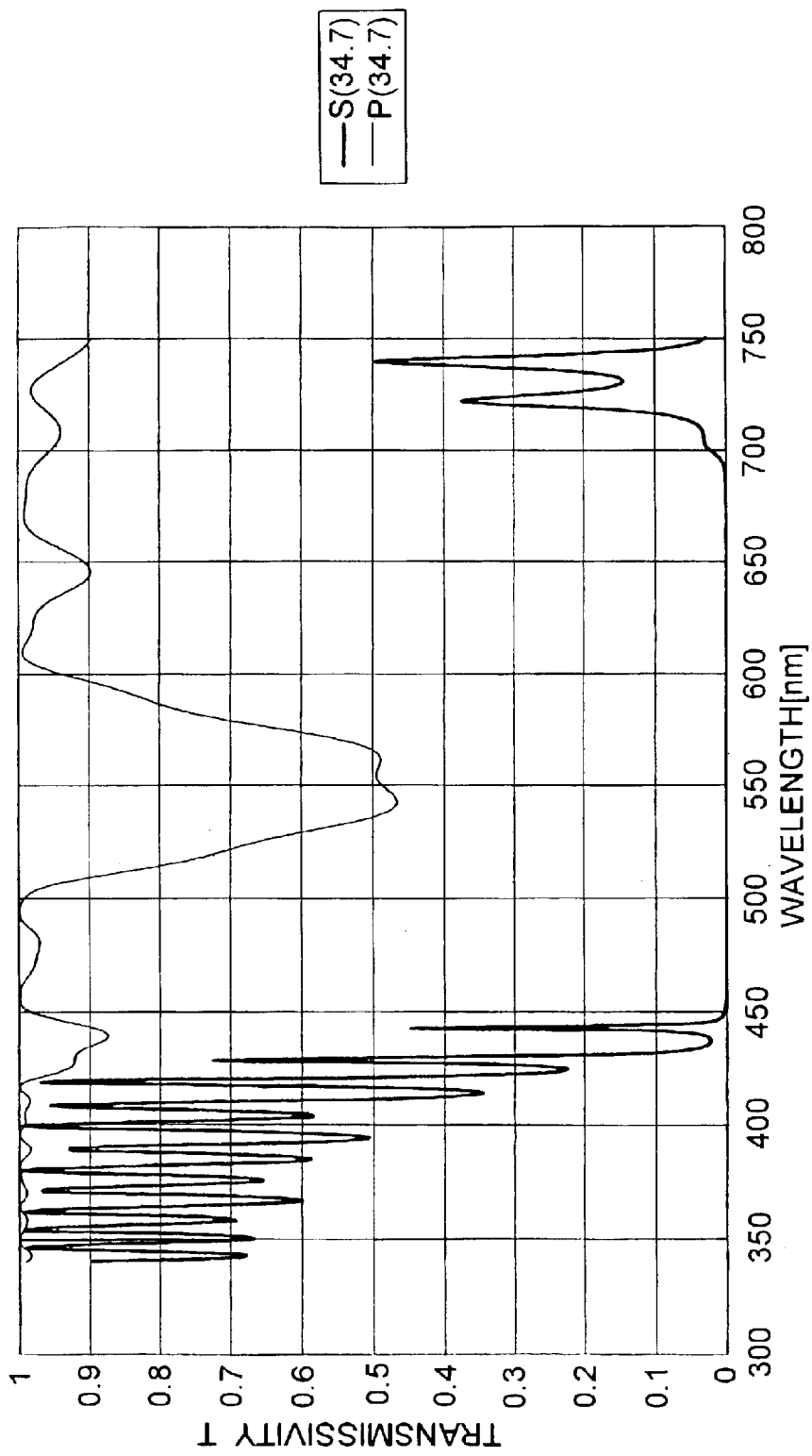
FIG. 23 is a diagram showing the relationship between wavelength and transmissivity observed for the ray that makes an angle of 34.7° with a normal to the dielectric multilayer film before entering the prism in the polarization beam splitter of Practical Example 7.
Figure 24:
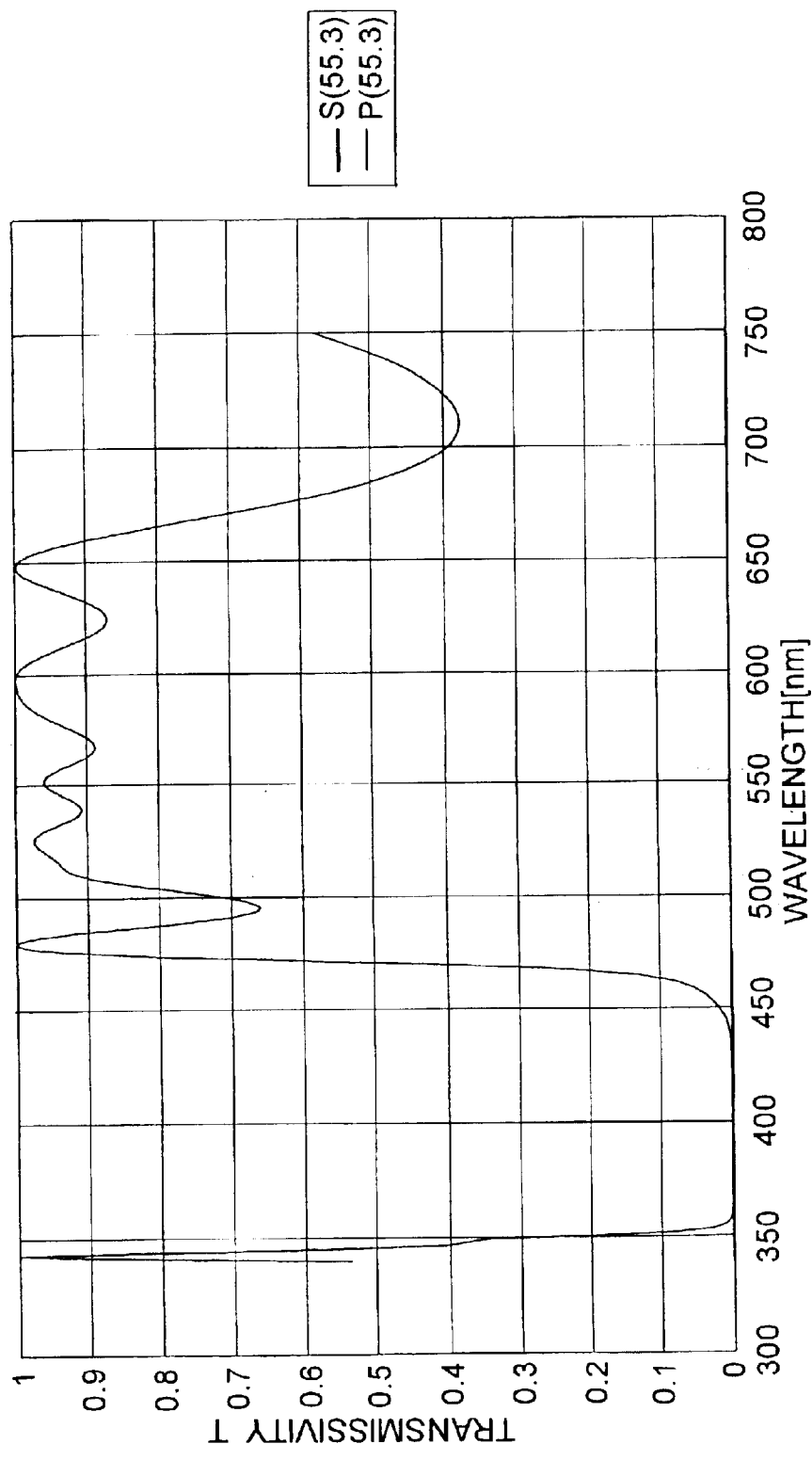
FIG. 24 is a diagram showing the relationship between wavelength and transmissivity observed for the ray that makes an angle of 55.3° with a normal to the dielectric multilayer film before entering the prism in the polarization beam splitter of Practical Example 7.
Figure 25:
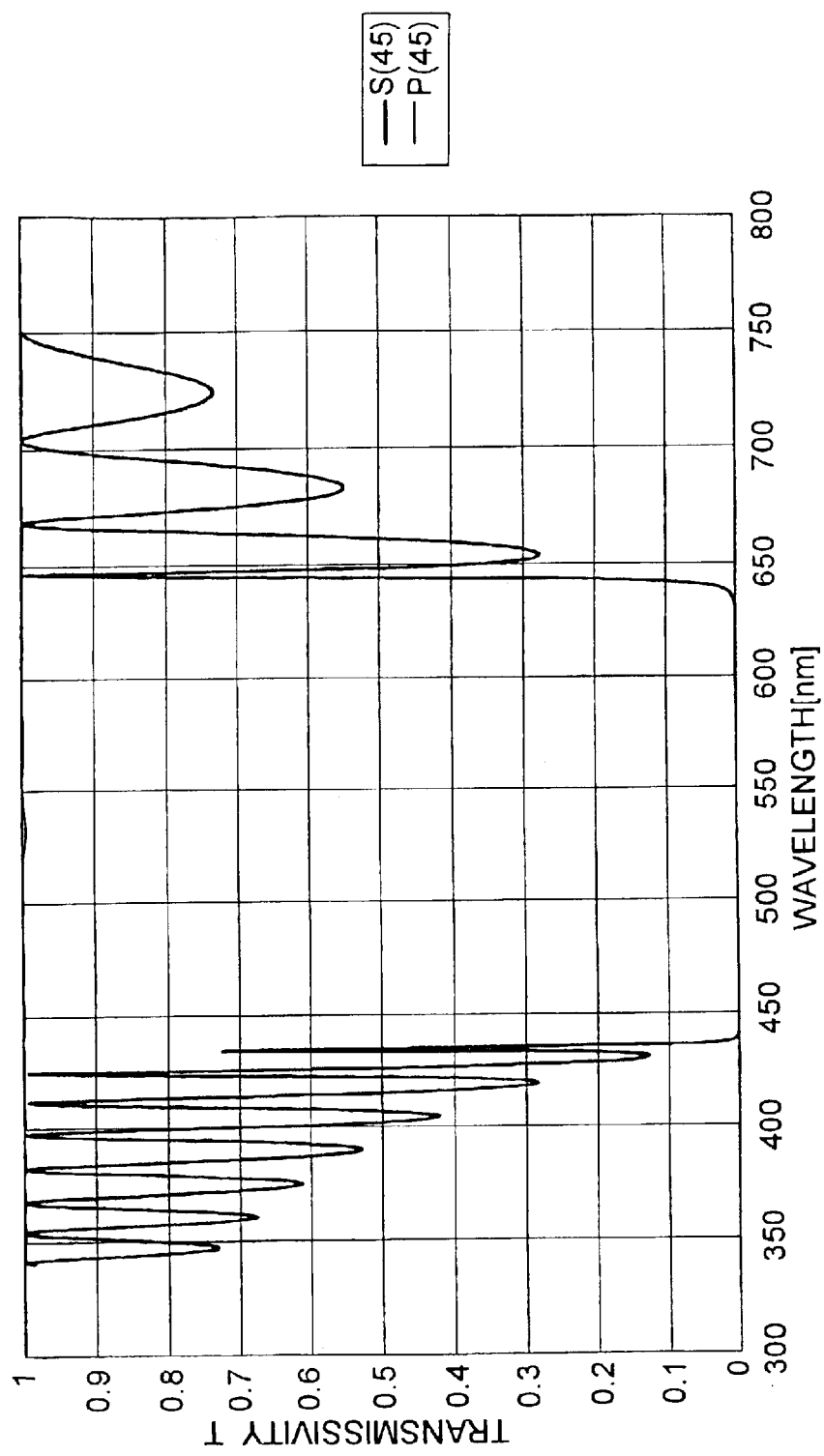
FIG. 25 is a diagram showing the relationship between wavelength and transmissivity observed for the ray that makes an angle of 45° with a normal to the dielectric multilayer film before entering the prism in a conventional polarization beam splitter.
Figure 26:
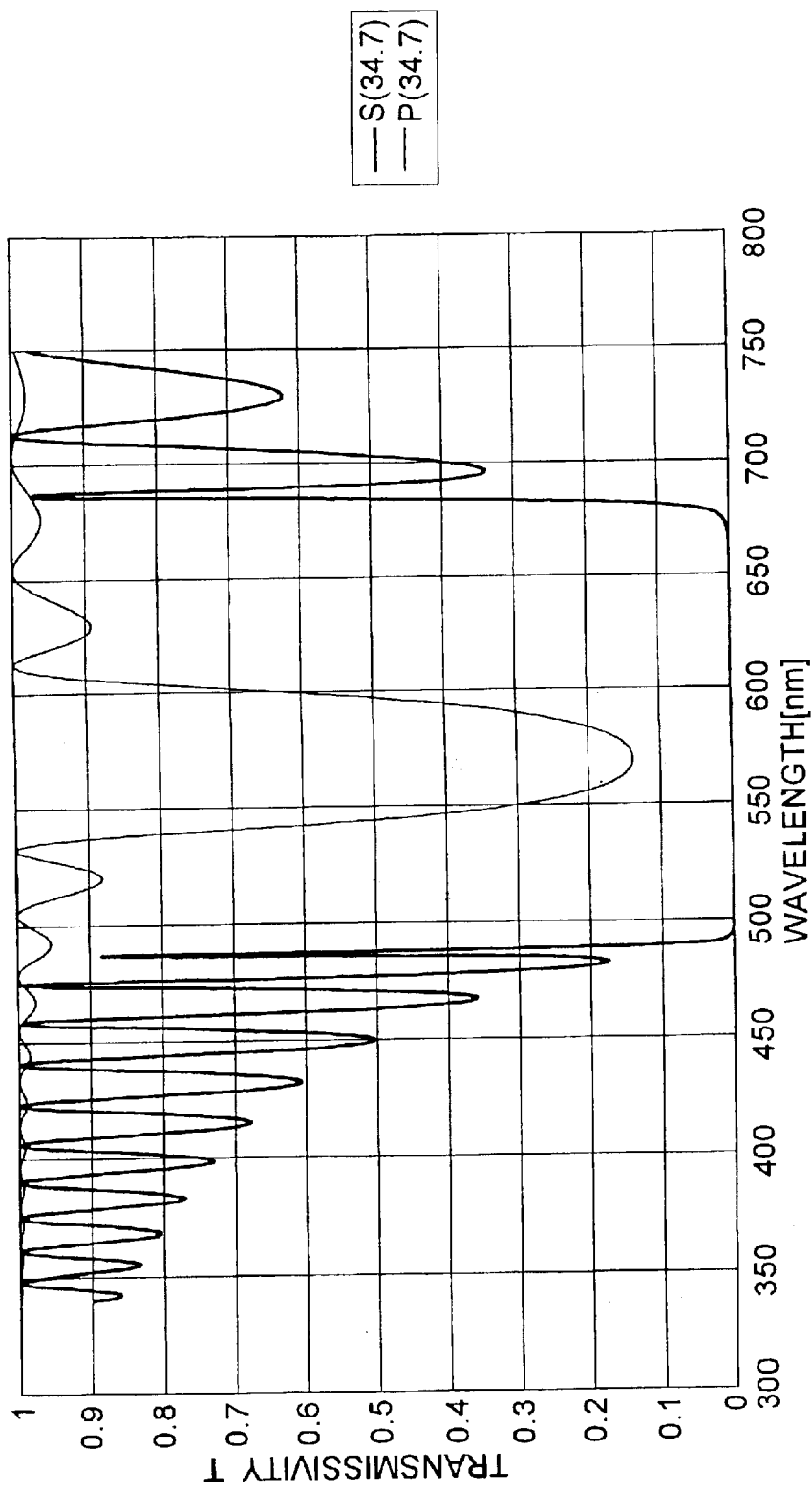
FIG. 26 is a diagram showing the relationship between wavelength and transmissivity observed for the ray that makes an angle of 34.7° with a normal to the dielectric multilayer film before entering the prism in the conventional polarization beam splitter.
Figure 27:
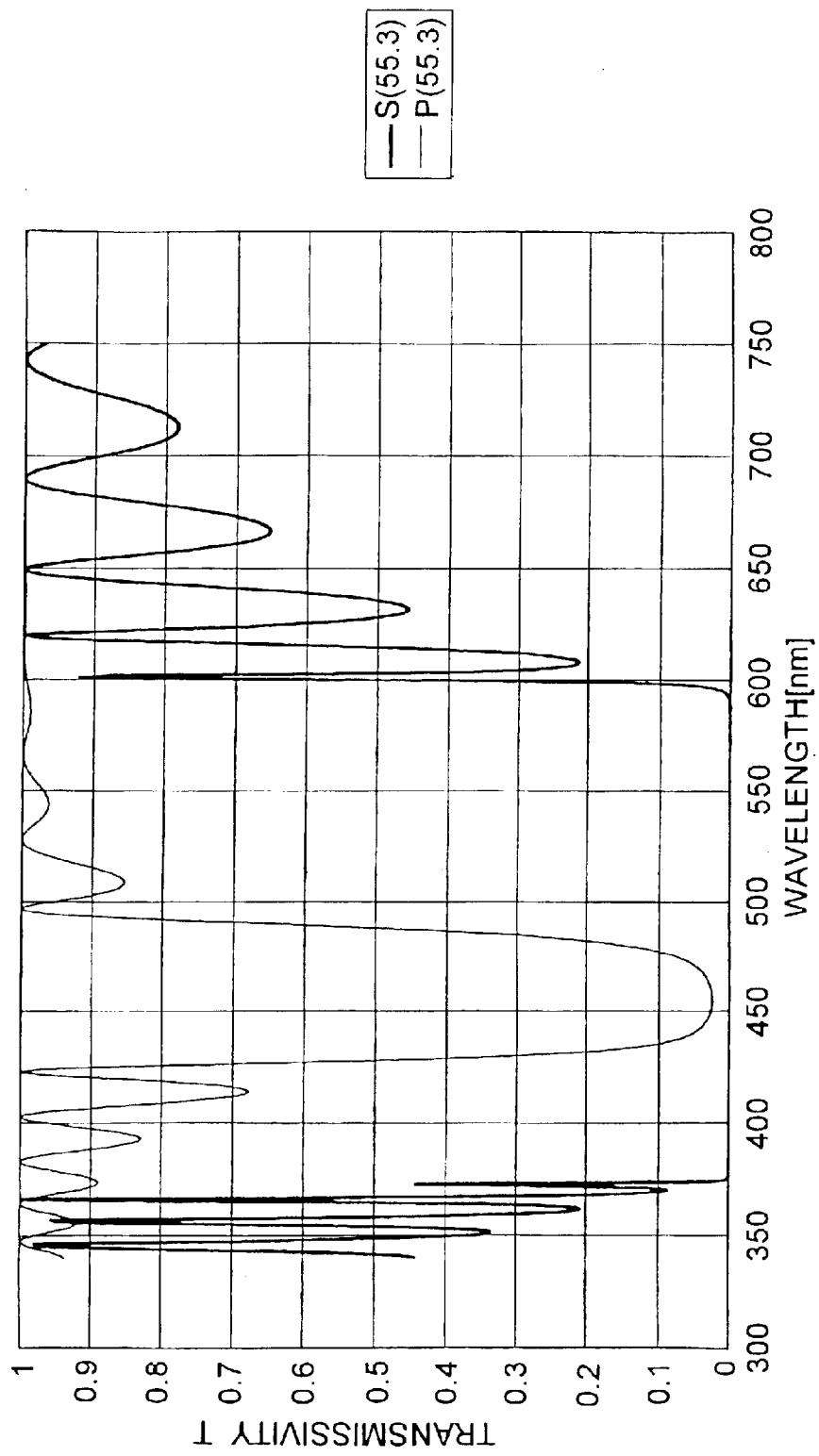
FIG. 27 is a diagram showing the relationship between wavelength and transmissivity observed for the ray that makes an angle of 55.3° with a normal to the dielectric multilayer film before entering the prism in the conventional polarization beam splitter.

FIGS. 22 to 24 show the relationship between the wavelength of light and transmissivity as observed in Practical Example 7. In these figures, thick lines represent the transmissivity for S-polarized light, and thin lines represent the transmissivity for P-polarized light. FIG. 22 deals with the ray that makes an angle of 45° with a normal to the dielectric multilayer film 30 before entering the first prism 10. FIG. 23 deals with the ray that makes an angle of 34.7° with a normal to the dielectric multilayer film 30 before entering the first prism 10, and FIG. 24 deals with the ray that makes an angle of 55.3° with a normal to the dielectric multilayer film 30 before entering the first prism 10. As described earlier, these three rays correspond to the principal ray and the two outermost rays of a convergent or divergent beam of light of which the f-number as observed in the layer of air is 2.8 and of which the principal ray makes an angle of 45° with the dielectric multilayer film 30.

As shown in FIG. 22, with the principal ray, which is incident on the dielectric multilayer film at an angle of incidence of 45°, it is possible to separate P- and S-polarized light effectively over a wavelength range of from about 520 nm to about 750 nm. Moreover, as shown in FIG. 23, with the outermost ray that is incident on the dielectric multilayer film at the smallest angle of incidence, effective polarization separation is possible over wavelength ranges of from about 430 nm to about 520 nm and from about 580 nm to about 720 nm. Furthermore, as shown in FIG. 24, with the outermost ray that is incident on the dielectric multilayer film at the largest angle of incidence, effective polarization separation is possible over a wavelength range of from about 500 nm to about 670 nm. Thus, in this practical example, the whole beam of light having an f-number as small as 2.8 can be subjected to effective polarization separation over a wavelength range of from about 580 nm to about 670

Obviously, many modifications and variations of the present invention are possible in light of the above teachings. It is therefore to be understood that within the scope of the appended claims, the invention may be practiced other than as specifically described.

What is claimed is:

1. A polarization beam splitter comprising:
   a first prism including a first surface on which light is incident and a second surface that makes an acute angle with the first surface;
   a second prism disposed so as to face the second surface of the first prism; and
   a dielectric multilayer film sandwiched between surfaces of the first and second prisms that face each other and composed of:
      a first multilayer portion having high-refractive-index layers and low-refractive-index layers laid alternately on one another so that each layer has an optical film thickness equal to ¼ of a first wavelength; and
      a second multilayer portion having high-refractive-index layers and low-refractive-index layers laid alternately on one another so that each layer has an optical film thickness equal to ¼ of a second wavelength,
   wherein, let
      the first wavelength be $\lambda 1$,
      the second wavelength be $\lambda 2$, and
      an angle that the first and second surfaces of the first prism make with each other be $\theta$,
   then the condition $$\lambda 1 < \lambda 2 \leq 1.55 \cdot \lambda 1$$

is fulfilled, and in addition, let
      a refractive index of the first prism be Nd,
      a refractive index of the high-refractive-index layers of the first multilayer portion be NH1,
      a refractive index of the low-refractive-index layers of the first multilayer portion be NL1,
      a refractive index of the high-refractive-index layers of the second multilayer portion be NH2, and
      a refractive index of the low-refractive-index layers of the second multilayer portion be NL2,
   then, for angles $\theta 1$ and $\theta 2$ that respectively fulfill $$\sin^2\theta 1 = NH1^2 \cdot NL1^2 / [Nd^2 \cdot (NH1^2 + NL1^2)] \text{ and}$$

$$\sin^2\theta 2 = NH2^2 \cdot NL2^2 / [Nd^2 \cdot (NH2^2 + NL2^2)],$$

the conditions $$|NH1-NL1| < |NH2-NL2| \text{ and } |\theta 1-\theta| < |\theta 2-\theta|, \text{ or}$$

$$|NH1-NL1| > |NH2-NL2| \text{ and } |\theta 1-\theta| > |\theta 2-\theta|$$

are fulfilled.

2. A polarization beam splitter as claimed in claim 1, wherein
   the high-refractive-index layers of the first multilayer portion are made of $TiO_2$ or $Ta_2O_5$,
   the low-refractive-index layers of the first multilayer portion are made of $MgF_2$ or $SiO_2$,
   the high-refractive-index layers of the second multilayer portion are made of $TiO_2$ or $Ta_2O_5$, and
   the low-refractive-index layers of the second multilayer portion are made of a mixture of $Al_2O_3$ and $La_2O_3$, a mixture of $Al_2O_3$ and $La_2O$, or $Al_2O_3$.

3. A polarization beam splitter as claimed in claim 1, wherein
   the high-refractive-index layers of the first multilayer portion are made of a mixture of $TiO_2$ and $La_2O_3$, a mixture of $TiO_2$ and $La_2O$, or $Ta_2O_5$,
   the low-refractive-index layers of the first multilayer portion are made of $MgF_2$ or $SiO_2$,
   the high-refractive-index layers of the second multilayer portion are made of $TiO_2$ or $Ta_2O_5$, and
   the low-refractive-index layers of the second multilayer portion are made of a mixture of $Al_2O_3$ and $La_2O_3$, a mixture of $Al_2O_3$ and $La_2O$, or $Al_2O_3$.

4. A polarization beam splitter as claimed in claim 1, wherein
   the high-refractive-index layers of the first multilayer portion are made of a mixture of $Al_2O_3$ and $La_2O_3$ or a mixture of $Al_2O_3$ and $La_2O$,
   the low-refractive-index layers of the first multilayer portion are made of $MgF_2$,
   the high-refractive-index layers of the second multilayer portion are made of $TiO_2$ or $Ta_2O_5$, and
   the low-refractive-index layers of the second multilayer portion are made of $Al_2O_3$.

5. A polarization beam splitter as claimed in claim 1, wherein
   the high-refractive-index layers of the first multilayer portion are made of $Al_2O_3$,
   the low-refractive-index layers of the first multilayer portion are made of $MgF_2$,
   the high-refractive-index layers of the second multilayer portion are made of $TiO_2$ or $Ta_2O_5$, and
   the low-refractive-index layers of the second multilayer portion are made of $SiO_2$.

6. A polarization beam splitter as claimed in claim 1, wherein the first and second prisms each have a shape of a right-angled isosceles triangle.

7. A polarization beam splitter as claimed in claim 1, wherein the first and second prisms have equal refractive indices for a same wavelength.

8. A polarization beam splitter as claimed in claim 1, wherein a ratio $\lambda 2/\lambda 1$ of the wavelength $\lambda 2$ to the wavelength $\lambda 1$ is equal to or higher than 1.1.

9. A polarization beam splitter as claimed in claim 1, wherein the light introduced through the first surface is visible light spending over a predetermined wavelength range between 480 nm and 750 nm.

10. A polarization beam splitter as claimed in claim 1, wherein the light introduced through the first surface is in a form of a convergent or divergent beam of which an f-number as observed in a layer of air is 2.8 and of which a principal ray makes an angle of 45° with the dielectric multilayer film.

* * * * *

UNITED STATES PATENT AND TRADEMARK OFFICE
CERTIFICATE OF CORRECTION

PATENT NO. : 6,791,750 B2
DATED : September 14, 2004
INVENTOR(S) : Tomokazu Masubuchi et al.

It is certified that error appears in the above-identified patent and that said Letters Patent is hereby corrected as shown below:

<u>Title page,</u>
Item [57], ABSTRACT,
Line 7, delete "$\lambda 1 < \lambda 2 \leq 155 \cdot \lambda 1$" and insert -- $\lambda 1 < \lambda 2 \leq \cdot 155 \cdot \lambda 1$ --.
Line 12, delete "greater differences" and insert -- greater of the differences --.

<u>Column 3,</u>
Line 64, delete "$\lambda 1 < \lambda 2 \leq 155 \cdot \lambda 1$" and insert -- $\lambda 1 < \lambda 2 \leq 1.55 \cdot \lambda 1$ --.

<u>Column 5,</u>
Line 20, "$TiO_{2\ and\ La2}\ O$," and insert -- $TiO_2$ and $La_2\ O$, --.
Line 18, insert -- and -- after "segments,"

<u>Column 19,</u>
Line 39, delete "$\lambda 1 < \lambda 2 \leq \cdot 155 \cdot \lambda 1$" and insert -- $\lambda 1 < \lambda 2 \leq 155 \cdot \lambda 1$ --.

<u>Column 20,</u>
Line 57, delete "light spending" and insert -- light spreading --.

Signed and Sealed this

Twenty-eighth Day of June, 2005

JON W. DUDAS
*Director of the United States Patent and Trademark Office*

UNITED STATES PATENT AND TRADEMARK OFFICE
CERTIFICATE OF CORRECTION

PATENT NO. : 6,791,750 B2
DATED : September 14, 2004
INVENTOR(S) : Tomokazu Masubuchi et al.

It is certified that error appears in the above-identified patent and that said Letters Patent is hereby corrected as shown below:

Title page,
Item [57], ABSTRACT,
Line 7, delete "$\lambda 1 < \lambda 2 \leq 155 \cdot \lambda 1$" and insert -- $\lambda 1 < \lambda 2 \leq 1.55 \cdot \lambda 1$ --.
Line 12, delete "greater differences" and insert -- greater of the differences --.

Column 3,
Line 64, delete "$\lambda 1 < \lambda 2 \leq 155 \cdot \lambda 1$" and insert -- $\lambda 1 < \lambda 2 \leq 1.55 \cdot \lambda 1$ --.

Column 5,
Line 20, "$TiO_{2 \text{ and } La2} O$," and insert -- $TiO_2$ and $La_2 O$, --.

Column 19,
Line 39, delete "$\lambda 1 < \lambda 2 \leq 1.55 \cdot \lambda 1$" and insert -- $\lambda 1 < \lambda 2 \leq 1.55 \cdot \lambda 1$ --.

Column 20,
Line 57, delete "light spending" and insert -- light spreading --.

This certificate superesedes Certificate of Correction issued June 28, 2005.

Signed and Sealed this

Twentieth Day of September, 2005

JON W. DUDAS
*Director of the United States Patent and Trademark Office*